(12) United States Patent
Engle

(10) Patent No.: US 11,678,759 B1
(45) Date of Patent: Jun. 20, 2023

(54) TRAILER BUNK BOARD RECARPETING TEMPLATE AND METHOD OF USING THE SAME

(71) Applicant: Aspired Companies, LLC, Aurora, CO (US)

(72) Inventor: Paul M. Engle, Aurora, CO (US)

(*) Notice: Subject to any disclaimer, the term of this patent is extended or adjusted under 35 U.S.C. 154(b) by 0 days.

(21) Appl. No.: 18/070,541

(22) Filed: Nov. 29, 2022

(51) Int. Cl.
*B60P 3/10* (2006.01)
*B26B 29/06* (2006.01)
*A47G 27/04* (2006.01)

(52) U.S. Cl.
CPC .......... *A47G 27/0487* (2013.01); *B26B 29/06* (2013.01); *B60P 3/1066* (2013.01)

(58) Field of Classification Search
CPC .... B60P 3/1066; B26B 29/06; A47G 27/0487
See application file for complete search history.

(56) References Cited

U.S. PATENT DOCUMENTS

| | | | |
|---|---|---|---|
| 4,659,409 A * | 4/1987 | Arafat ....................... | B44C 1/04 33/12 |
| 4,776,100 A | 10/1988 | Brumley | |
| D422,535 S | 4/2000 | Thompson | |
| D487,423 S | 3/2004 | Davidson et al. | |
| 7,584,981 B2 | 9/2009 | Vonderahe et al. | |
| D639,188 S | 6/2011 | Zieman | |
| D728,390 S | 5/2015 | Tucker | |
| 9,771,013 B1 * | 9/2017 | Delanghe ................. | B32B 3/266 |
| D848,869 S | 5/2019 | Alvarez et al. | |
| D937,106 S | 11/2021 | Noterman et al. | |
| 2003/0042704 A1 * | 3/2003 | Higginson ............ | B60P 3/1066 280/414.1 |
| 2007/0170692 A1 * | 7/2007 | MacKarvich ......... | B60P 3/1066 280/414.1 |
| 2014/0377045 A1 * | 12/2014 | Harms, Jr. ............ | B60P 3/1066 414/537 |
| 2015/0298779 A1 | 10/2015 | Swart | |

FOREIGN PATENT DOCUMENTS

GB          2310158 A  *  8/1997  ......... A47G 27/0487

* cited by examiner

*Primary Examiner* — Kaitlin S Joerger
(74) *Attorney, Agent, or Firm* — Goldstein Law Offices, P.C.

(57) ABSTRACT

A trailer bunk board recarpeting template includes a first section, a second section, a midsection, a first leg extending from the first section, a second leg extending from the second section, a male member, and at least two female slits configured to removably receive the male member to enable adjustment of the first section with respect to the second section. The first and second leg form a space having a width defined by the distance therebetween. The female slits positions on the template corresponds to bunk boards of varying widths. Accordingly, the slits position affects the width of the space when the male member is engaged with the slits, thereby allowing the space to be selectively adjusted to accommodate bunk boards of varying widths. The space identifies areas on a carpet to mark and cut to fit a bunk board of a particular size.

26 Claims, 19 Drawing Sheets

US 11,678,759 B1

TRAILER BUNK BOARD RECARPETING TEMPLATE AND METHOD OF USING THE SAME

TECHNICAL FIELD

The present disclosure relates generally to trailer bunk boards and their covers. More particularly, the present disclosure relates to a template device for recarpeting the trailer bunk boards.

BACKGROUND

Boat trailers are utilized to transport boats or other watercraft to and from a body of water. A typical construction of a boat trailer includes two or more substantially parallel bunk boards that are positioned substantially orthogonal to an axle of the trailer. The bunk boards provide the necessary support during transport so that the boat can be moved on the trailer without damaging the hull.

A typical construction of a bunk board includes a beam that is typically a 2-inch by 4-inch cross section, a 2-inch by 6-inch cross section, or a 2-inch by 8-inch cross section. A typical material of construction of the trailer bunk is wood. However, the bunk can be constructed from other materials of construction. A person transporting the boat may not want to have the hull in direct contact with the wood bunk, as the wood may not provide sufficient cushioning and may dent the hull, especially during travel over bumpy roads or rough terrain. Further, the boat has a tendency to move, at least slightly, in back and forth motion that is transverse to the longitudinal axis of the wood bunk during transit. Therefore, direct contact of the hull with the exposed wood bunk has the potential to scratch or otherwise damage the finish or paint of the hull.

To minimize the damage that can be incurred by the boat hull during transit, carpeting is typically placed around at least the load bearing surfaces of the bunk. The carpeting provides cushioning and rounds the sharp corner edges of the bunk, which reduces the risk that the boat hull will be damaged by denting or scraping during transit.

However, the bunk board carpeting must be replaced after some time from normal wear and tear. Currently, there are no efficient and convenient tools for aiding in the recarpeting of the bunk boards. Accordingly, there is a need in the art for a template device that facilitates the recarpeting of bunk boards.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions, or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a trailer bunk board recarpeting template that facilitates the recarpeting of trailer bunk boards necessary for supporting a boat. Accordingly, the present disclosure provides a template for positioning over a carpet and serving as a guide for identifying areas of the carpet to mark and make square cuts over to create foldable areas in the carpet, thereby enabling quick and efficient recarpeting of a trailer bunk board using the carpet.

Another aspect of an example embodiment in the present disclosure is to provide a trailer bunk board recarpeting template that may be adjusted to various widths to serve as a guide for marking and cutting a carpet that is specific to a trailer bunk board of a particular size/width. Accordingly, the template of the present disclosure includes a body including a first member having a first leg, a midsection including at least two template-adjusting female slits extending across the width of the midsection, and a second member including a second leg and a male member configured to removably engage the at least two template-adjusting female slits of the midsection. The template-adjusting female slits correspond to a trailer bunk board of a particular size. The template-adjusting female slits are spaced apart from each other at a distance along the length of the midsection. The second member is adjustable with respect to the first member along the template-adjusting female slits. When the second member is engaged with the first member, the first leg and second leg form a space therebetween that is disposed underneath the midsection. The space includes a width defined by the distance between the first leg and the second leg. The width of the space is adjustable to accommodate a trailer bunk board of a particular size by positioning the male member on any one of the template-adjusting female slits. The width of the space is adjustable to a size that corresponds to the width of a bunk board to be recarpeted. The space identifies areas to be cut on a carpet to fit the bunk board to be recarpeted.

Yet another aspect of an example embodiment in the present disclosure is to provide a trailer bunk board recarpeting template that may be used to determine the center of a width of a carpet to identify a center reference point on which to center the template when marking the carpet. Accordingly, the template of the present disclosure includes a plurality of measurement markings extending along a longitudinal edge of the body that are interspaced at common intervals for measuring.

Still another aspect of an example embodiment in the present disclosure is to provide a trailer bunk board recarpeting template that may be used to identify a reference point upon which to position the template such that the template corresponds to a trailer bunk board of a particular size/width and the resultant marked and cut carpet corresponds to the trailer bunk board of the particular size/width. Accordingly, the template of the present invention includes reference indicia disposed along the midsection that correspond to a trailer bunk board of a particular size/width. Each reference indicia identifies the center of the width of the space that corresponds to the center of the bunk board of the particular width. The center of the width of the space identifies a reference point upon which to position the space so as to correspond to the bunk board of the particular width and identify the areas to be cut for the bunk board of the particular width.

Still another aspect of an example embodiment in the present disclosure is to provide a method of recarpeting a trailer bunk board from a pre-cut piece of carpet specific to the size of the trailer bunk board to be recarpeted. Accordingly, the present disclosure provides a method of cutting a carpet to recarpet a trailer bunk board using the trailer bunk board recarpeting template of the present invention including adjusting the first member with respect to the second member to make the space between the first leg and the second leg have a width that is substantially equal in size to the width of a trailer bunk board to be recarpeted by inserting the male member into the at least two template-adjusting female slits, aligning an upper edge of the first member with an upper edge of the second member, aligning an edge of the first leg and an edge of the second leg with a lateral edge of a carpet; marking the carpet along an inner edge of the first leg to form a first inner marking on the carpet, marking the carpet along an inner edge of the second leg to form a second inner marking on the carpet, marking the carpet along an outer edge of the first member to form a first outer marking on the carpet, marking the carpet along an outer edge of the second member to form a second outer marking on the carpet, cutting along the first inner marking in a direction substantially perpendicular to the lateral edge of the carpet to form a first substantially linear cut, cutting along the second inner marking in a direction substantially perpendicular to the lateral edge of the carpet to form a second substantially linear cut, cutting away an area of the carpet between the first outer marking and a first longitudinal edge of the carpet, and cutting away an area of the carpet between the second outer marking and a second longitudinal edge of the carpet.

Still another aspect of an example embodiment in the present disclosure is to provide a method of recarpeting a trailer bunk board from a piece of carpet that is non-specific to the size of the trailer bunk board to be recarpeted. Accordingly, the present disclosure provides a method of cutting a carpet to recarpet a trailer bunk board using the trailer bunk board recarpeting template of the present invention including identifying a center of a width of a carpet by using the plurality of measurements markings, marking the center of the width of the carpet to form a central reference point on the carpet, adjusting the first member with respect to the second member to make the space between the first leg and the second leg have a width that is substantially equal in size to the width of a trailer bunk board to be recarpeted, aligning the reference indicia corresponding to the particular width of the bunk board to be recarpeted with the central reference point to identify the center of the trailer bunk board to be recarpeted, aligning a lower edge of the first leg and a lower edge of the second leg with a lateral edge of a carpet, marking the carpet along an inner edge of the first leg to form a first inner marking on the carpet; marking the carpet along an inner edge of the second leg to form a second inner marking on the carpet, marking the carpet along an outer edge of the first member to form a first outer marking on the carpet, marking the carpet along an outer edge of the second member to form a second outer marking on the carpet, cutting along the first inner marking in a direction substantially perpendicular to the lateral edge of the carpet to form a first substantially linear cut, cutting along the second inner marking in a direction substantially perpendicular to the lateral edge of the carpet to form a second substantially linear cut, cutting away an area of the carpet between the first outer marking and a first longitudinal edge of the carpet, and cutting away an area of the carpet between the second outer marking and a second longitudinal edge of the carpet.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
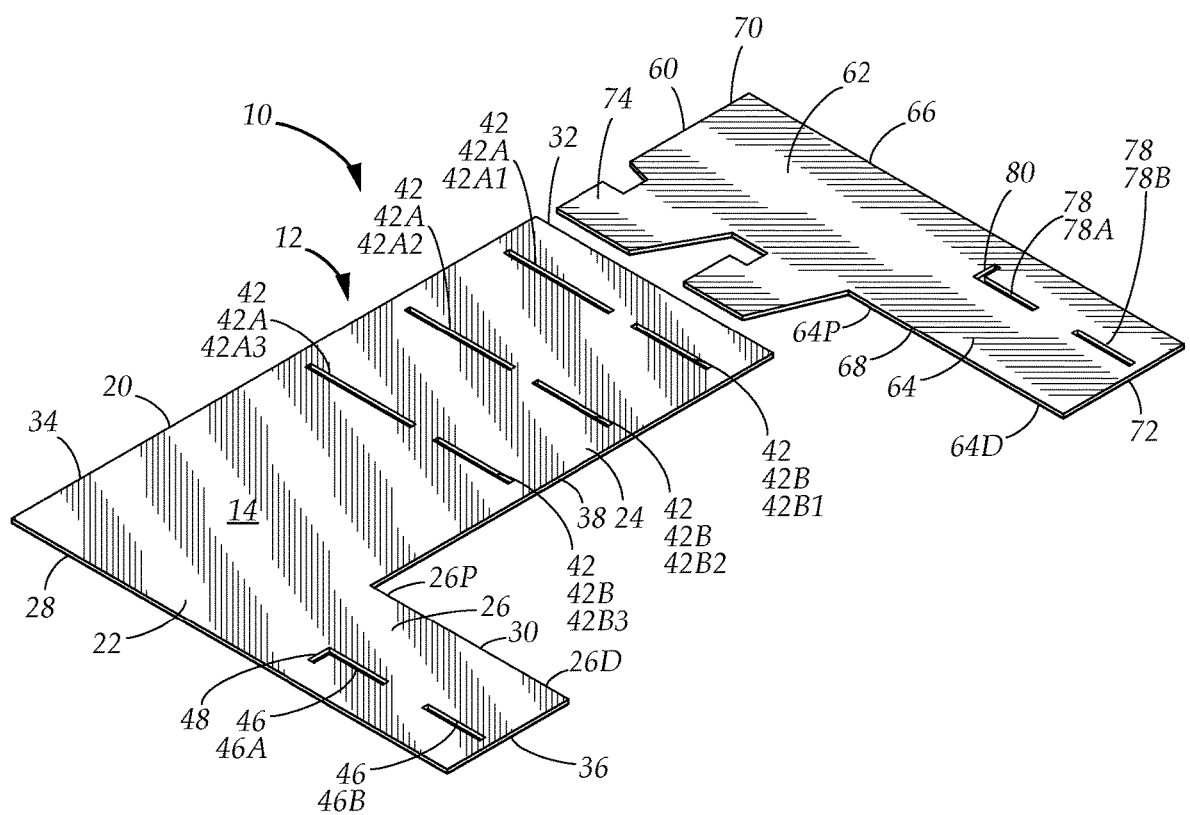
FIG. 1 is a perspective view of the trailer bunk board recarpeting template, illustrating the first member and second member separate prior to engagement of the male member with the template-adjusting female slits and positioning over a carpet for marking according to one embodiment of the present disclosure.

FIG. 1 illustrates the trailer bunk board recarpeting template 10 according to one embodiment of the present invention. The recarpeting template 10 enables users to identify the areas of a carpet to be cut for facilitating the recarpeting of a trailer bunk board. The recarpeting template 10 includes a configuration that guides marking of a carpet in specific areas. These marked areas are then cut such that they may easily be folded over the end of a trailer bunk board and fastened thereto. Without these cuts the carpet is not amendable to folding adequately over the bunk board end, thereby making it difficult to recarpet the bunk board. Without the recarpeting template 10 a user would have to either guess where to make the cuts on the carpet or make measurements to determine where to make the appropriate cuts in the carpet to accommodate a particularly sized bunk board.

Figure 2A:
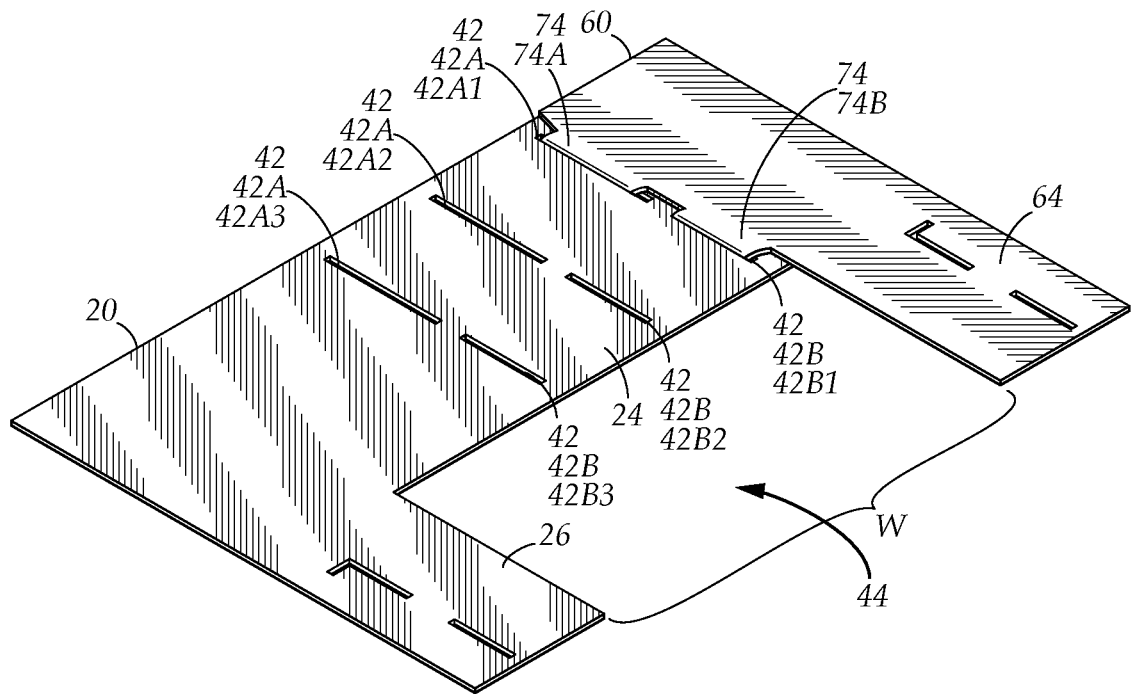
FIG. 2A is a top perspective view of the trailer bunk board recarpeting template, illustrating the male member engaged with one of the template-adjusting female slits to adjust the width of the template to generate a marked and cut carpet that accommodates a trailer bunk board of a first size according to one embodiment of the present disclosure.
Figure 2B:
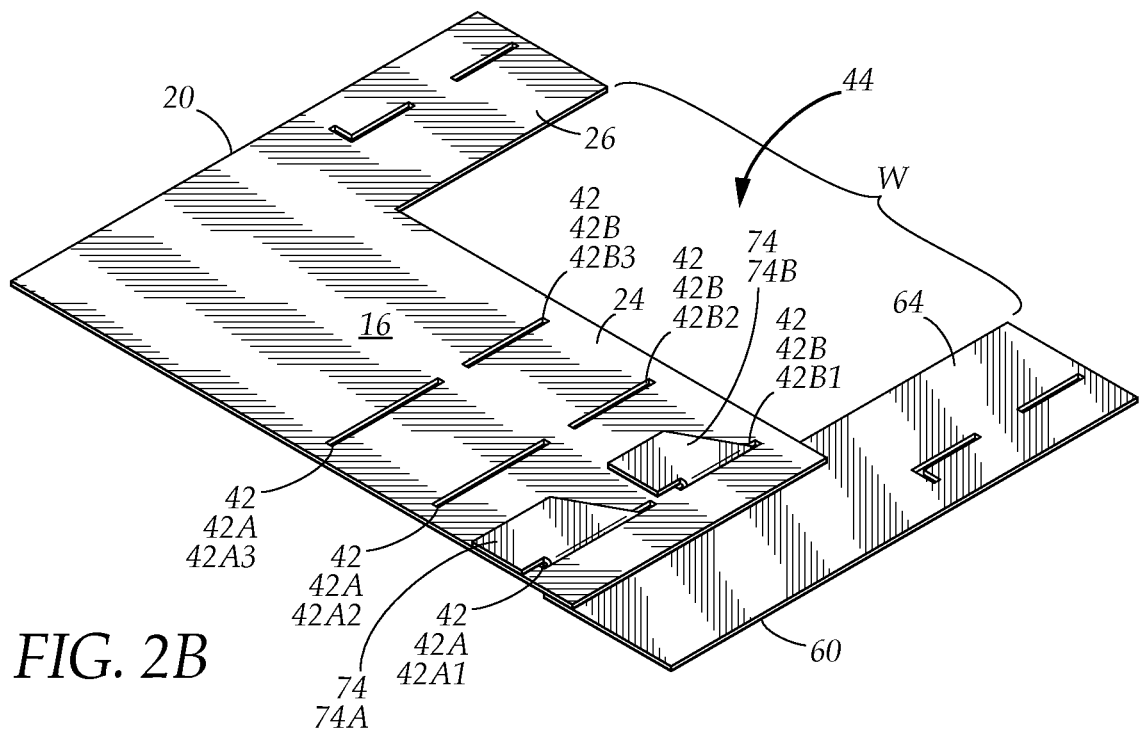
FIG. 2B is a bottom perspective view of the trailer bunk board recarpeting template of FIG. 2A, illustrating a manner in which the male member engages the template-adjusting female slits according to one embodiment of the present disclosure.
Figure 3A:
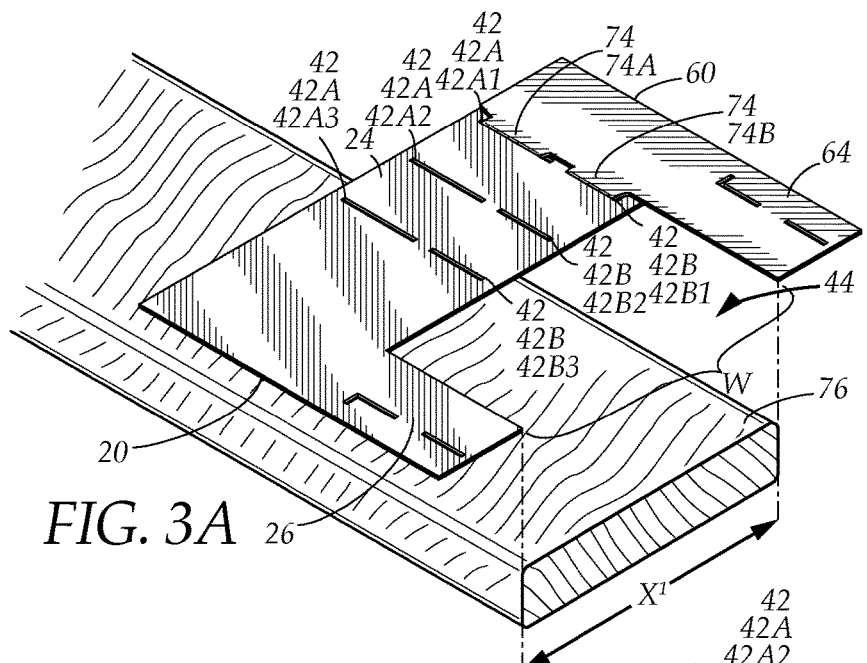
FIG. 3A is a perspective view of the trailer bunk board recarpeting template superimposed over a trailer bunk board of a first size, illustrating a manner in which the template may adjust to accommodate trailer bunk boards of different sizes, namely, illustrating the male member in a first template-adjusting female slit to adjust the width of the template such that the width of the template corresponds to the trailer bunk board of the first size according to one embodiment of the present disclosure.
Figure 3B:
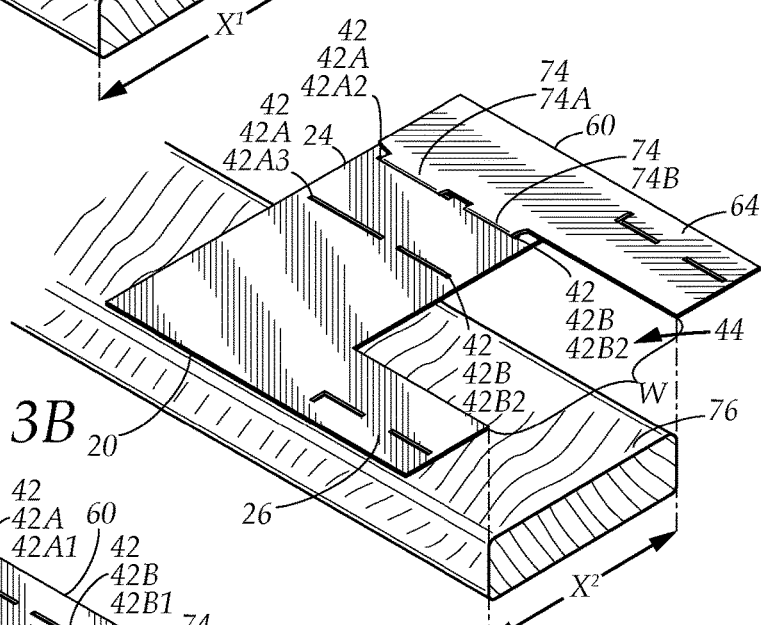
FIG. 3B is a perspective view of the trailer bunk board recarpeting template superimposed over a trailer bunk board of a second size, illustrating a manner in which the template may adjust to accommodate trailer bunk boards of different sizes, namely, illustrating the male member in a second template-adjusting female slit to adjust the width of the template such that the width of the template corresponds to the trailer bunk board of the second size according to one embodiment of the present disclosure.
Figure 3C:
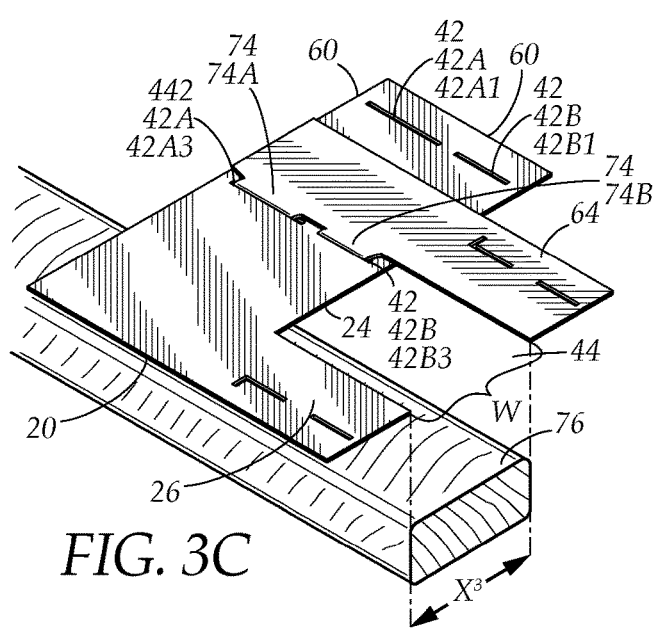
FIG. 3C is a perspective view of the trailer bunk board recarpeting template superimposed over a trailer bunk board of a third size, illustrating a manner in which the template may adjust to accommodate trailer bunk boards of different sizes, namely, illustrating the male member in a third template-adjusting female slit to adjust the width of the template such that the width of the template corresponds to the trailer bunk board of the third size according to one embodiment of the present disclosure.

The recarpeting template 10 comprises a body 12 including a first surface 14, a second surface 16 (shown in FIG. 2B) opposite the first surface 14, a first member 20 having a first section 22, a second member 60 having a second section 62 opposite the first section 22, and a midsection 24 disposed between the first section 22 and the second section 62. Note, the first member 20 and second member 60 are shown as separate and discrete members, but the present disclosure contemplates embodiments wherein the first member 20 and second member 60 are coupled and/or connected to each other as a single unit. The body 12 may comprise a paper material, plastic material, or metal material of uniform cross-sectional thickness.

In embodiments, the first member 20 includes the midsection 24, a first leg 26 extending orthogonally outwardly relative to the body 12, a first outer edge 28, an inner first leg edge 30, an outer midsection edge 32, an upper edge 34, a lower first leg edge 36, and a lower midsection edge 38. The inner first leg edge 30 and the outer midsection edge 32 are parallel and linearly offset with respect to each other. The first outer edge 28 is opposite the inner first leg edge 30 and the outer midsection edge 32. The lower first leg edge 36 and the lower midsection edge 38 are parallel and linearly offset with respect to each other. The upper edge 34 is opposite the lower first leg edge 36 and the lower midsection edge 38.

In embodiments, the second member 60 includes a second leg 64 extending orthogonally outwardly relative to the body 12, a second outer edge 66, an inner edge 68, an upper edge 70, a lower edge 72, and a male member 74 protruding outwardly from the inner edge 68. The second outer edge 66 is opposite the inner edge 68 and the first outer edge 28 of the first member 20. The upper edge 70 is opposite the lower edge 72. The male member 74 is coplanar with the second member 60.

In embodiments, the first leg 26 and the second leg 64 are coplanar with the body 12 and symmetrical with respect to each other about a center of the body 12. The first leg 26 and second leg 64 define an adjustable space 44 (shown in FIG. 2A and FIG. 2B) therebetween that is disposed underneath the midsection 24. The first leg 26 includes a proximal end 26P, a distal end 26D opposite the proximal end 26P, a length, and a width. The second leg 64 includes a proximal end 64P, a distal end 64D opposite the proximal end 64P, a length, and a width. In some embodiments, the length of the first leg 26 and the second leg 64 is substantially 3 and 3/16 inches.

In embodiments, the first leg 26 comprises a first longitudinal slit 46 extending longitudinally along the length of the first leg 26 and a first transverse slit 48 extending orthogonally outwardly from an upper end of the first longitudinal slit 46 toward the first outer edge 28 of the first section 22. The first longitudinal slit 46 and the first transverse slit 48 extend entirely through the first member 20 from the first surface 14 to the second surface 16. The second leg 64 comprises a second longitudinal slit 78 extending longitudinally along the length of the second leg 64 and a second transverse slit 80 extending orthogonally outwardly from an upper end of the second longitudinal slit 78 toward the second outer edge 66 of the second section 62. The second longitudinal slit 78 and the second transverse slit 80 extend entirely through the second member 60 from the first surface 14 to the second surface 16. In some embodiments, the first longitudinal slit 46 comprises a pair of collinear slits 46A, 46B spaced apart from each other and the second longitudinal slit 78 comprises a pair of collinear slits 78A, 78B spaces apart from each other. In some embodiments, the distance between the inner first leg edge 30 and the first longitudinal slit 46 is substantially 1 and ⅝ inches and the distance between the inner edge 68 of the second leg 64 and the second longitudinal slit 78 is substantially 1 and ⅝ inches.

In embodiments, the midsection 24 includes a width, a length, the lower midsection edge 38 spanning the midsection 24 between the first leg 26 and the second leg 64, and at least two template-adjusting female slits 42 extending across the width of the midsection 24 and extending entirely through the body 12 from the first surface 14 to the second surface 16. The template-adjusting female slits 42 are spaced apart from each other at interval distances along the length of the midsection 24. The first section 22 is adjustable with respect to the second section 62 along the template-adjusting female slits 42. The template-adjusting female slits are configured to receive the male member 74. The template-adjusting female slits 42 correspond to a particular width of a trailer bunk board to be recarpeted. The slits 42 position on the template affects the width of the space 44 when the male member is engaged with the slits 42, thereby allowing the space 44 to be adjusted.

The at least two template-adjusting female slits 42 may comprise a pair of collinear slits 42A, 42B spaced apart from each other. The at least two template-adjusting female slits 42 may comprises three pairs of collinear slits 42A, 42B including a first pair of collinear slits 42A1, 42B1, a second pair of collinear slits 42A2, 42B2, and a third pair of collinear slits 42A3, 42B3. The first pair of collinear slits 42A1, 42B1 are disposed adjacent the outer midsection edge 32, the second pair of collinear slits 42A2, 42B2 are disposed interiorly with respect to the first pair of collinear slits 42A1, 42B1, and the third pair of collinear slits 42A3, 42B3 are disposed interiorly with respect to the second pair of collinear slits 42A2, 42B2 between the second pair of collinear slits 42A2, 42B2 and the first outer edge 28. The second pair of collinear slits 42A2, 42B2 are disposed between the first pair of collinear slits 42A1, 42B1 and the third pair of collinear slits 42A3, 42B3. The three pairs of collinear slits 42A, 42B are aligned with respect to one another. In some embodiments, the distance between the first pair of collinear slits 42A1, 42B1 and the second pair of collinear slits 42A2, 42B2 is substantially 2 inches and the distance between the second pair of collinear slits 42A2, 42B2 and the third pair of collinear slits 42A3, 42B3 is substantially 2 inches.

Referring now to FIG. 2A, FIG. 2B, FIG. 3A, FIG. 3B, and FIG. 3C, in conjunction with FIG. 1, the male member 74 is configured to removably engage the at least two template-adjusting female slits 42 of the midsection 24. The male member 74 comprises a pair of planar hooks 74A, 74B that correspond to the pair of collinear slits 42A, 42B. The pair of hooks 74A, 74B are coplanar with respect to each other and configured to removably engage either of the pairs of the collinear slit 42A, 42B. The space 44 includes a width W defined by the distance between the first leg 26 and the second leg 64 when the male member 74 of the first member 20 is engaged to the at least two template-adjusting female slits 42 of the second member 60. The space 44 identifies areas to be marked and cut on a carpet to fit the bunk board to be recarpeted 76. The width W is adjustable by positioning the male member 74 on any one of the template-adjusting female slits 42. The width W is adjustable to a size that corresponds to the width X of a bunk board to be recarpeted 76. For example, when the pair of planar hooks 74A, 74B are engaged to the first pair of collinear slits 42A1, 42B1 the width W is at its maximum width and corresponds to width $X^1$ of the bunk board to be recarpeted 76. When the pair of planar hooks 74A, 74B are engaged with the third pair of collinear slits 42A3, 42B3 the width W is at its minimum width and corresponds to width $X^3$ of the bunk board to be recarpeted 76. When the pair of planar hooks 74A, 74B are engaged with the second pair of collinear slits 42A2, 42B2 the width W is at its median width, or between the maximum width and the minimum width, and corresponds to width $X^2$ of the bunk board to be recarpeted 76. In some embodiments, the width W at its maximum width is substantially 8 inches, the width W at its minimum width is substantially 4 inches, and the width W at its median width is substantially 6 inches.

Figure 4A:
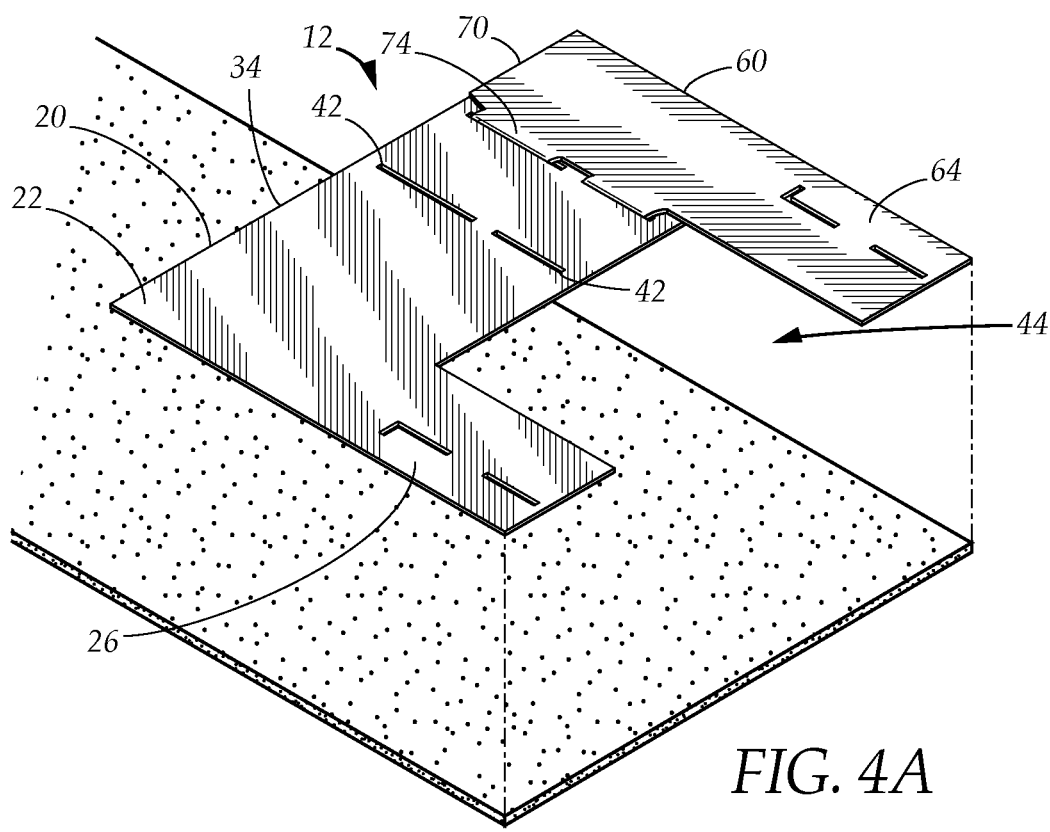
FIG. 4A is a perspective view of the trailer bunk board recarpeting template superimposed over a pre-cut piece of carpet, illustrating a manner in which the template aligns with the carpet edges prior to marking according to one embodiment of the present disclosure.

Referring now to FIG. 4A, the present disclosure provides a method of using the template of FIG. 1 to mark and cut a carpet for the purpose of recarpeting a trailer bunk board. In embodiments, the method includes adjusting the first section 22 of the body 12 with respect to the second section 62 of the body 12 to make the space 44 between the first leg 26 and the second leg 64 have a width that is substantially equal in size to the width of a trailer bunk board to be recarpeted. The first section 22 may be adjusted with respect to the second section 62, for example, by selectively engaging either the at least two template-adjusting female slits 42 with the male member 74. In some embodiments, to adjust the template, the method further incudes aligning the upper edge 34 of the first member 20 with the upper edge 70 of the second member 60.

Figure 4B:
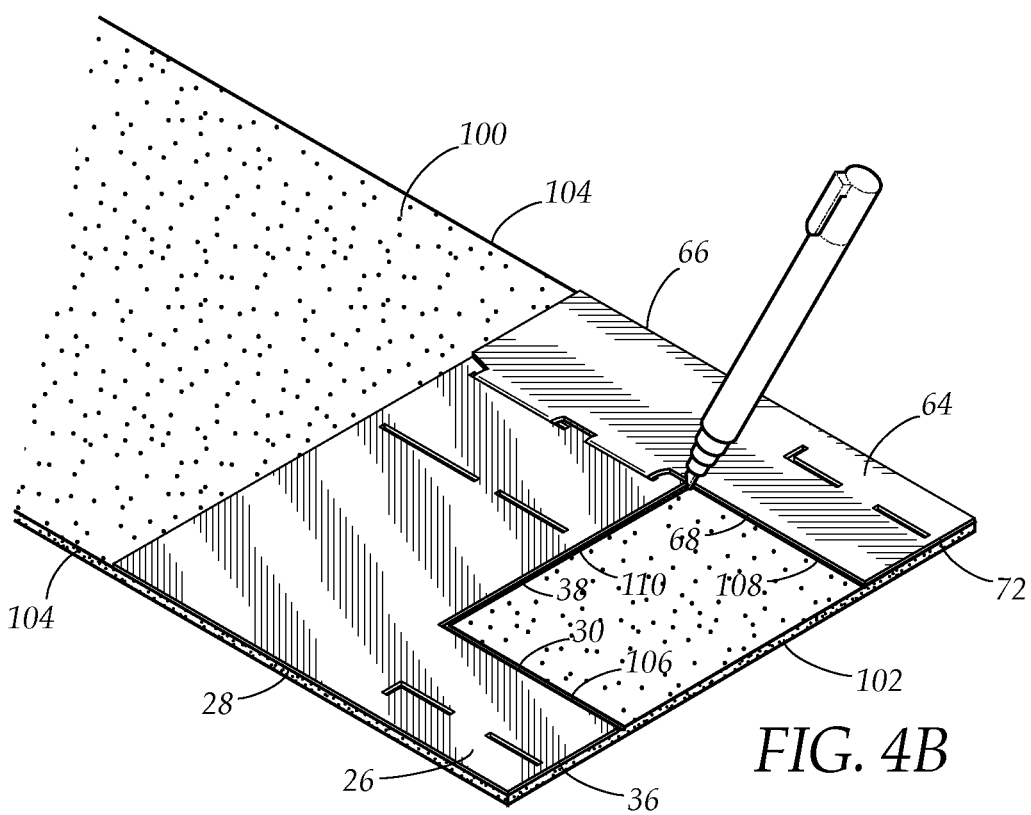
FIG. 4B is a perspective view of the trailer bunk board recarpeting template positioned on a pre-cut piece of carpet, illustrating the template aligned with the longitudinal and lateral edges of the carpet and further illustrating a manner in which the template is marked along its inner edges to establish inner markings on the carpet for cutting according to one embodiment of the present disclosure.

Referring now to FIG. 4B, the method further includes aligning the lower first leg edge 36 and the lower edge 72 of the second leg 64 with a lateral edge 102 of a carpet 100. The method may further include aligning the first outer edge 28 and the second outer edge 66 with the longitudinal edges 104 of the carpet 100. The method may include marking the carpet 100 along the inner first leg edge 30 to form a first inner marking 106 on the carpet 100, along the inner edge 68 of the second leg to form a second inner marking 108 on the carpet, and along the lower midsection edge 38 to form a third inner marking 110. Next, the method may include marking the carpet 100 along the first outer edge 28 to form a first outer marking on the carpet 100 and marking the carpet 100 along the second outer edge 66 to form a second outer marking on the carpet 100.

Figure 4C:
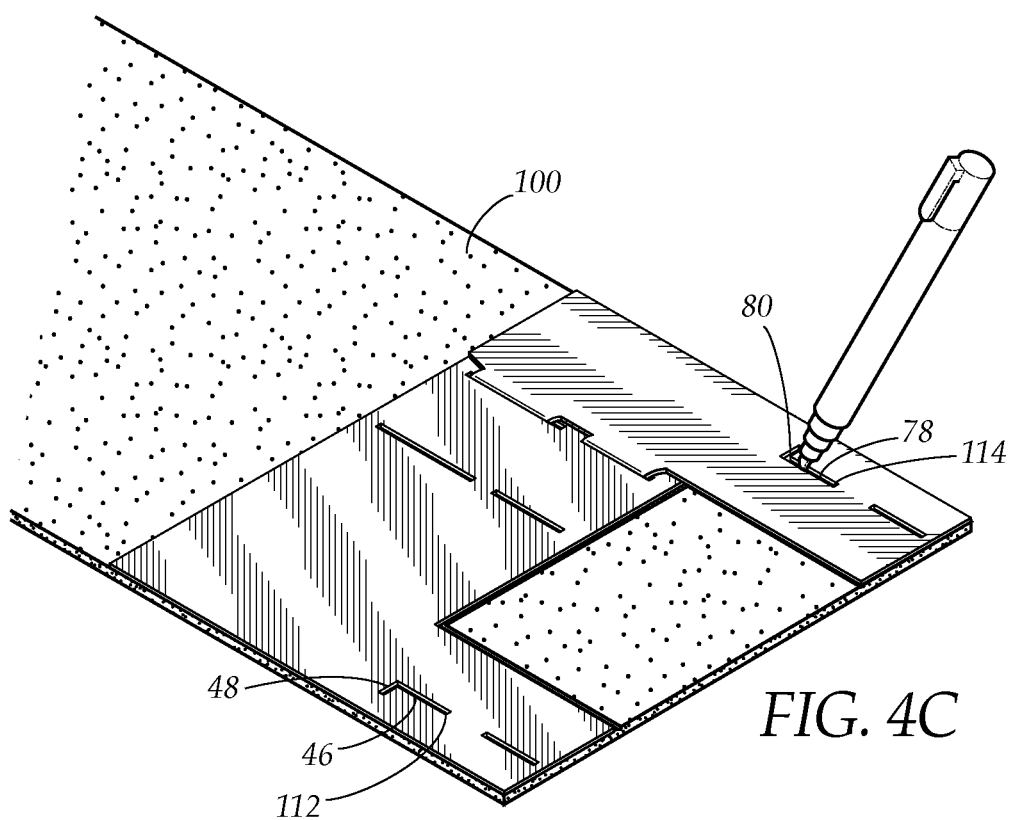
FIG. 4C is a perspective view of the trailer bunk board recarpeting template positioned on a pre-cut piece of carpet, illustrating a manner in which the template is marked along one of its longitudinal slits to establish outer markings on the carpet for cutting according to one embodiment of the present disclosure.
Figure 4D:
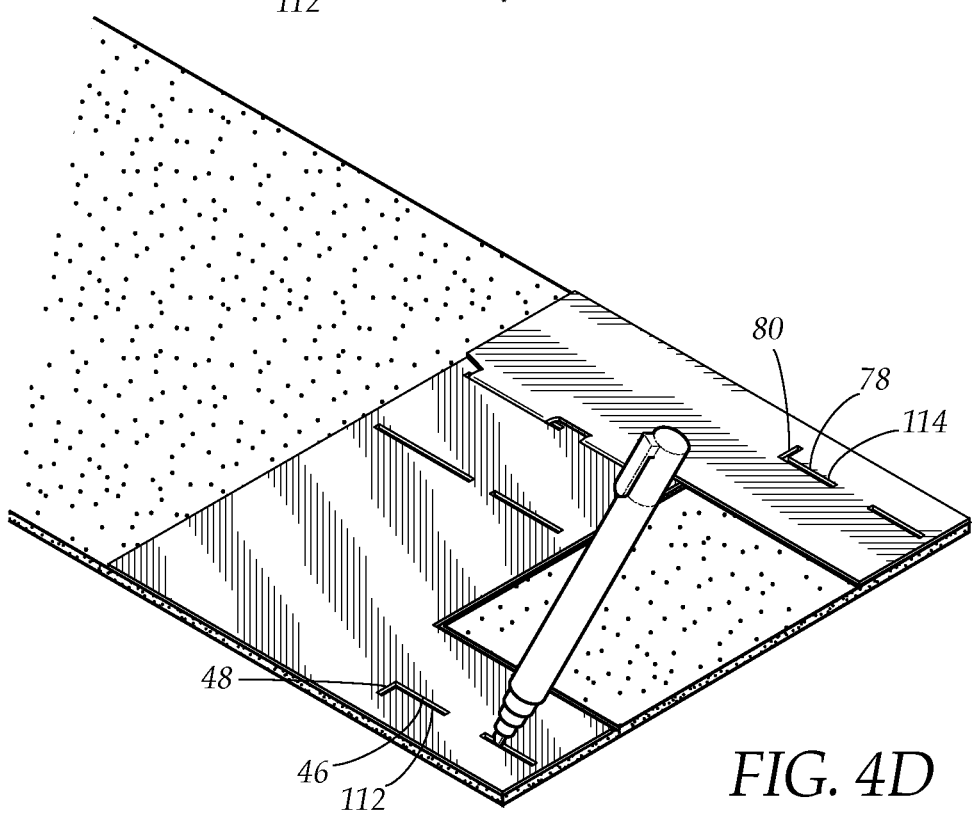
FIG. 4D is a perspective view of the trailer bunk board recarpeting template positioned on a pre-cut piece of carpet, illustrating a manner in which the template is marked along another of its longitudinal slits to establish outer markings on the carpet for cutting according to one embodiment of the present disclosure.
Figure 4E:
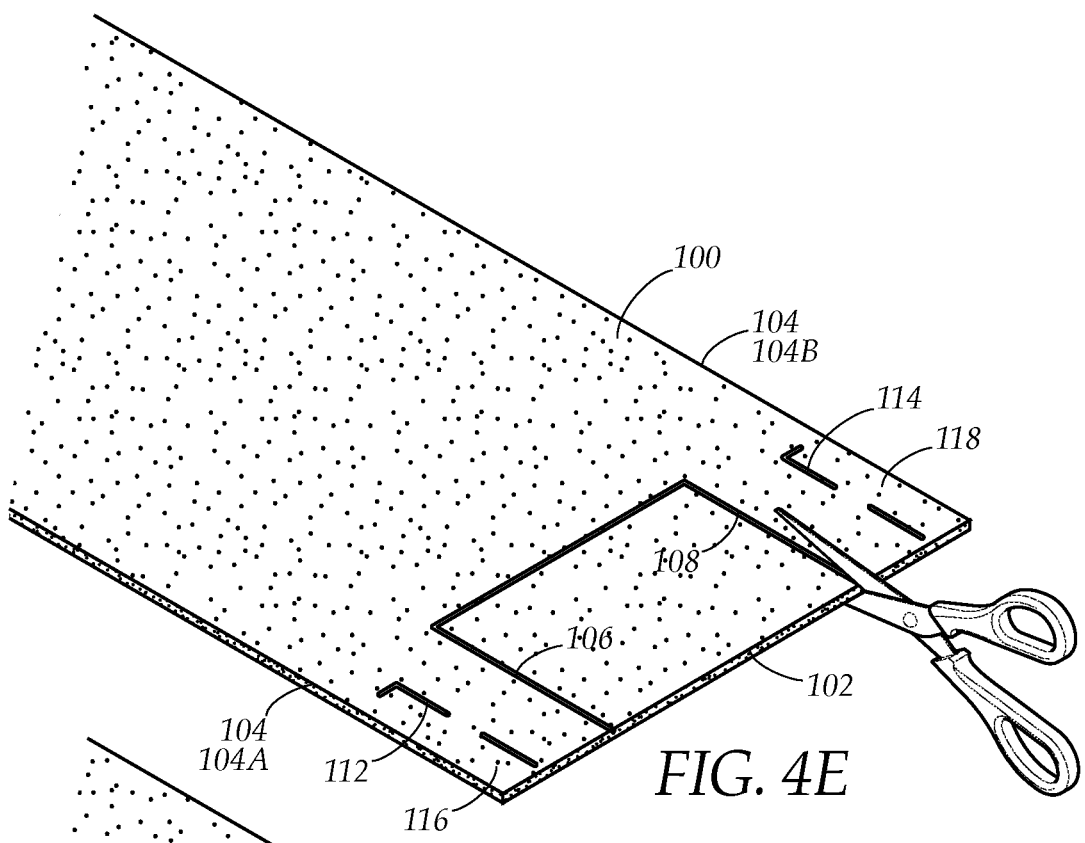
FIG. 4E is a perspective view of the trailer bunk board recarpeting template removed from the carpet after marking, illustrating the inner and outer markings on the carpet and a manner in which the carpet is cut along the inner markings in order to accommodate a trailer bunk board according to one embodiment of the present disclosure.
Figure 4F:
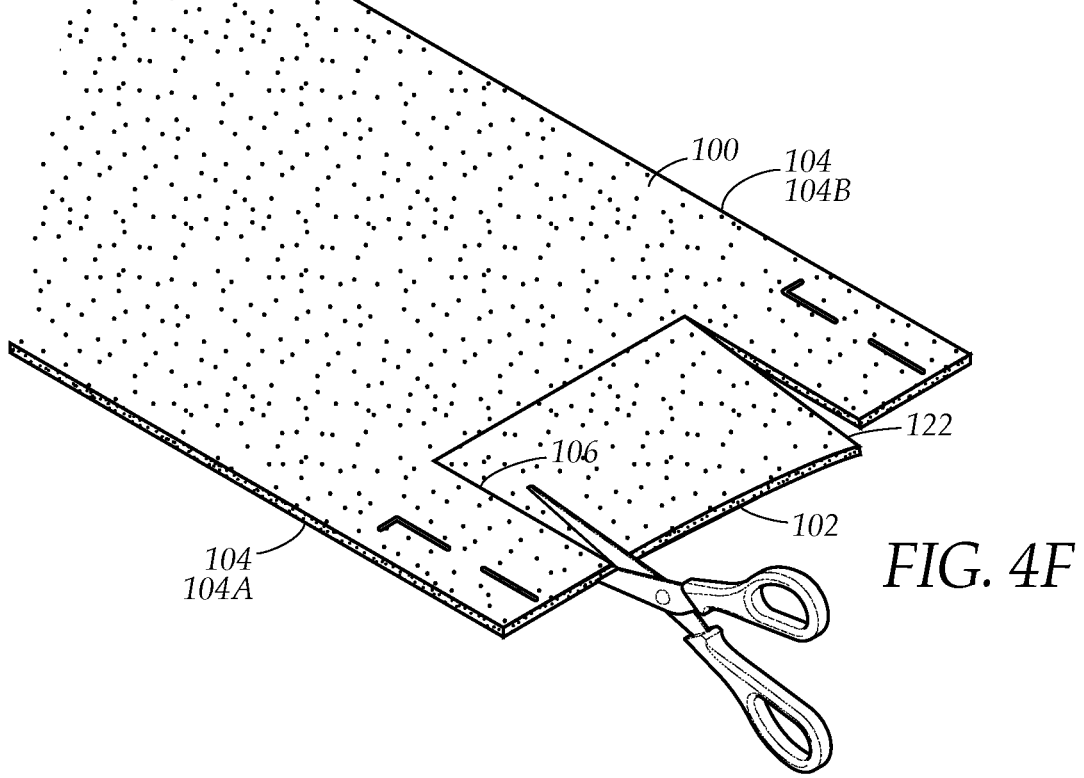
FIG. 4F is a perspective view of the trailer bunk board recarpeting template removed from the carpet after marking, illustrating the inner and outer markings on the carpet and a manner in which the carpet is cut along inner markings in order to accommodate a trailer bunk board according to one embodiment of the present disclosure.
Figure 4G:
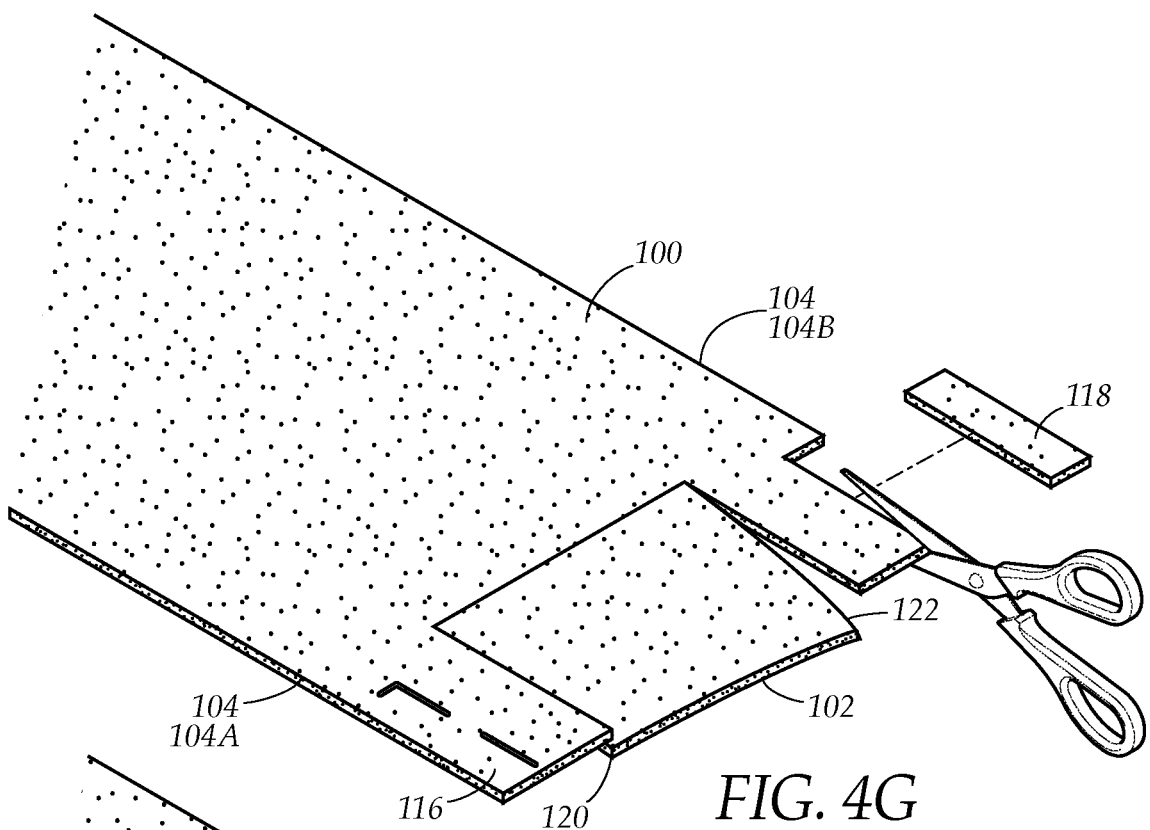
FIG. 4G is a perspective view of the trailer bunk board recarpeting template removed from the carpet after marking, illustrating the inner and outer markings on the carpet and a manner in which the carpet is cut along the outer markings to form a resultant carpet workpiece which accommodate a trailer bunk board according to one embodiment of the present disclosure.
Figure 4H:
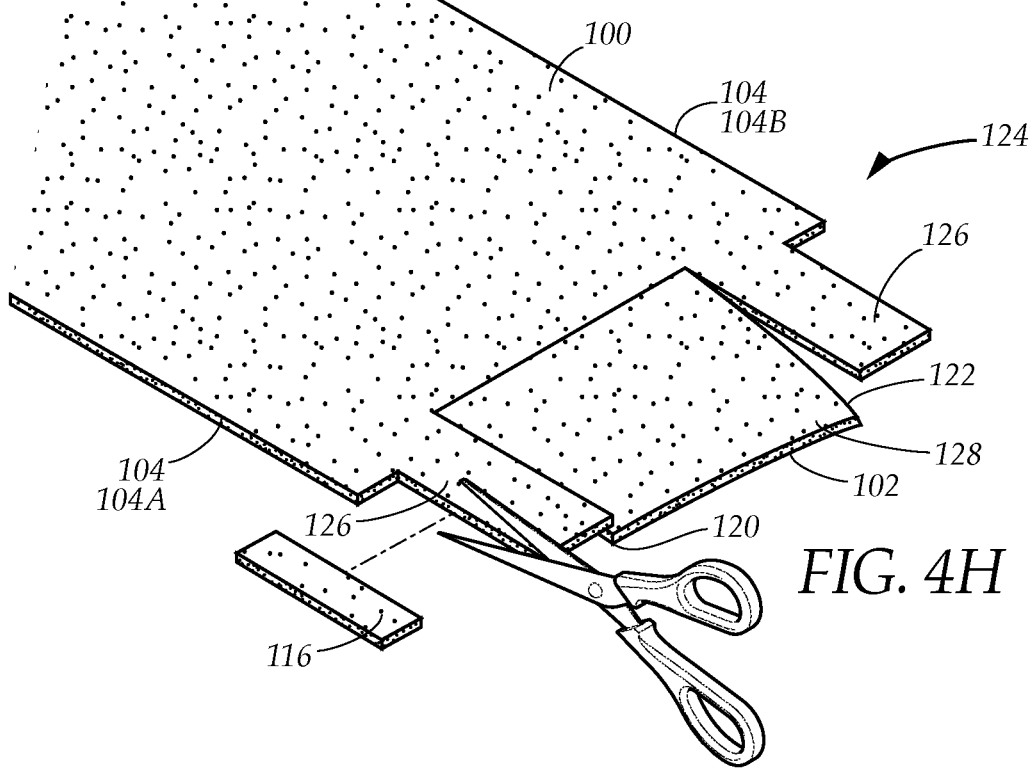
FIG. 4H is a perspective view of the trailer bunk board recarpeting template removed from the carpet after marking, illustrating the inner and outer markings on the carpet and a manner in which the carpet is cut along the outer markings to form a resultant carpet workpiece which accommodates a trailer bunk board according to one embodiment of the present disclosure.
Figure 4I:
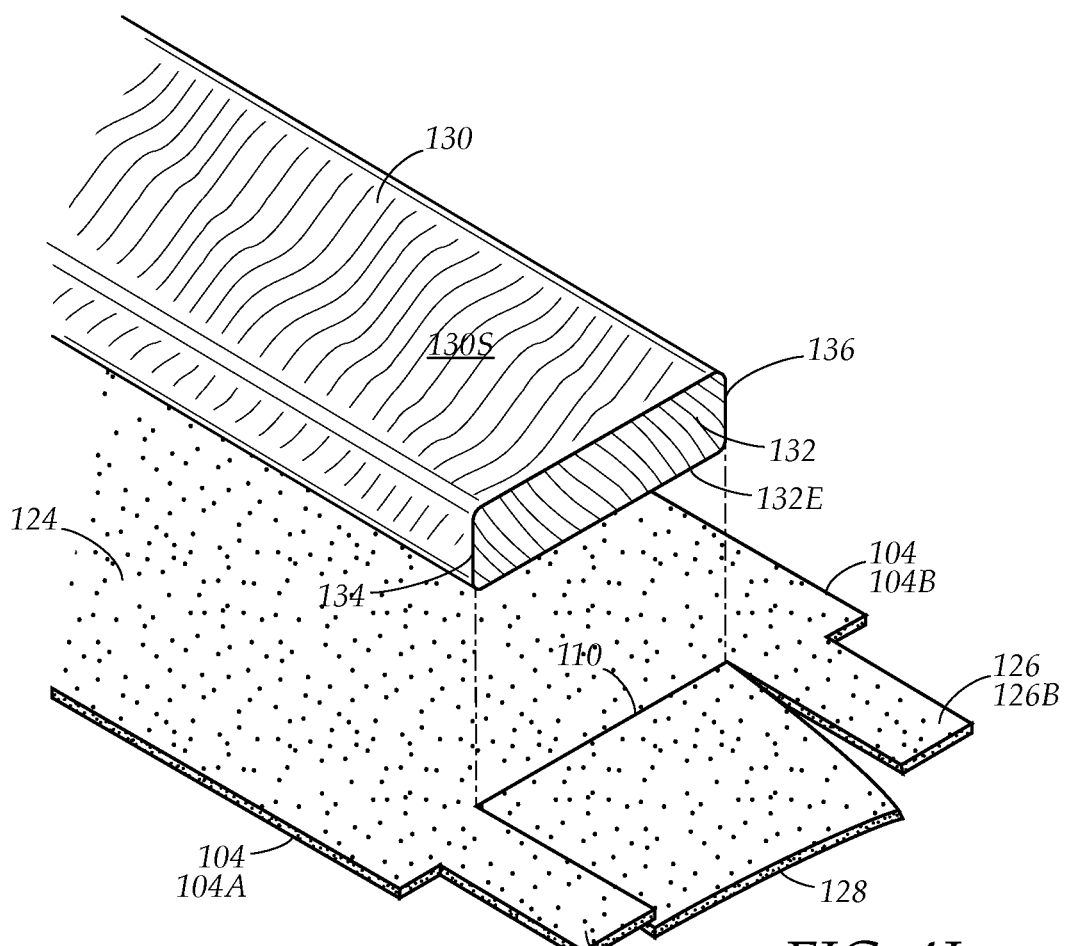
FIG. 4I is a perspective view of a trailer bunk board superimposed over a resultant carpet workpiece formed using the trailer bunk board recarpeting template, illustrating a manner in which the trailer bunk board aligns with the inner markings on the carpet in order to position the trailer bunk board and wrap the resultant carpet workpiece over the trailer bunk board according to one embodiment of the present disclosure.
Figure 4J:
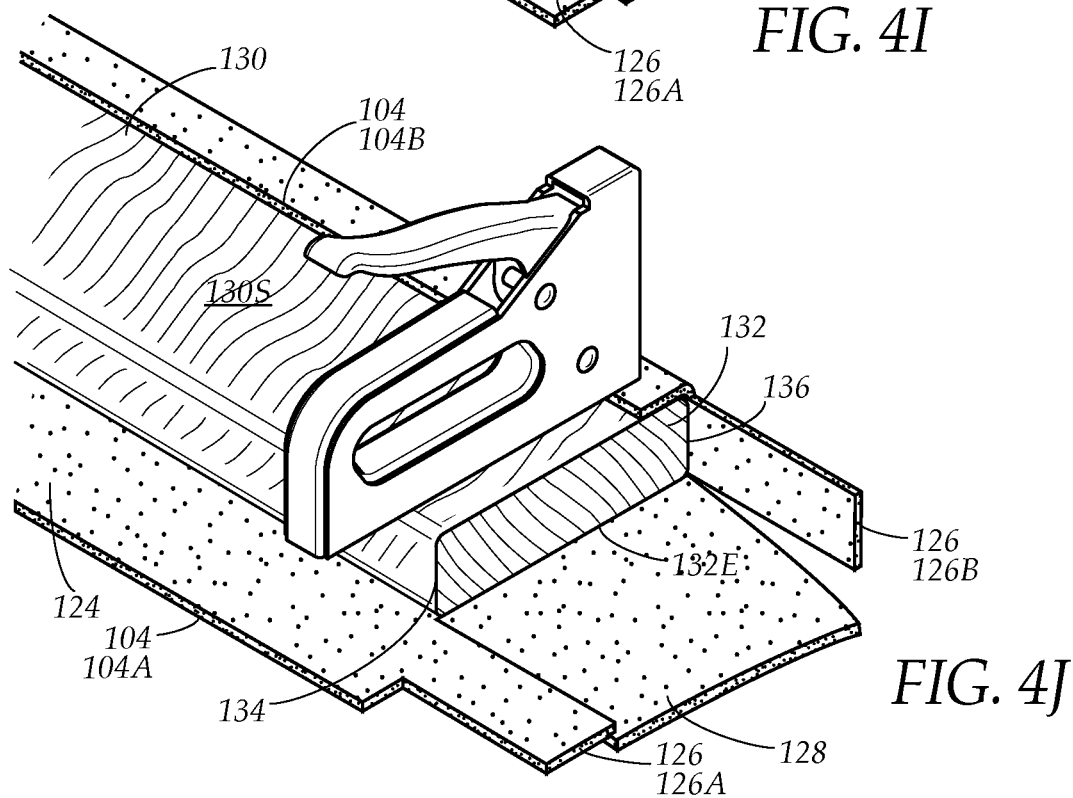
FIG. 4J is a perspective view of a trailer bunk board positioned over a resultant carpet workpiece formed using the trailer bunk board recarpeting template, illustrating a manner in which a side of the carpet workpiece is folded over the bunk board and fastened thereto according to one embodiment of the present disclosure.
Figure 4K:
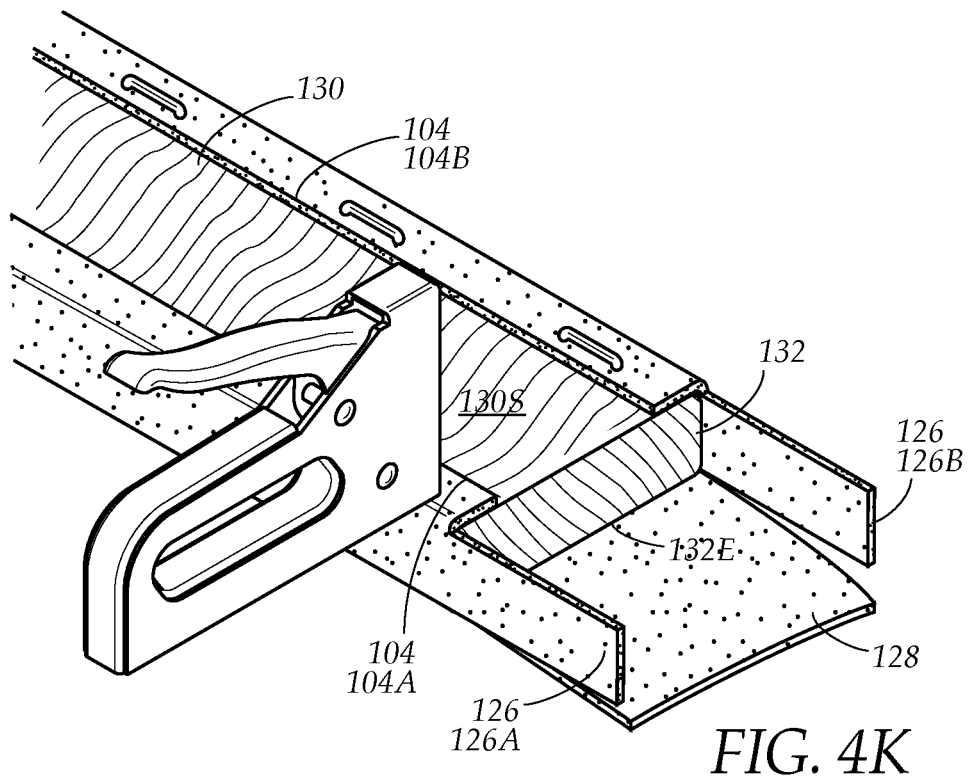
FIG. 4K is a perspective view of a trailer bunk board positioned over a resultant carpet workpiece formed using the trailer bunk board recarpeting template, illustrating a manner in which another side of the carpet workpiece is folded over the bottom of the bunk board and fastened thereto according to one embodiment of the present disclosure.
Figure 4L:
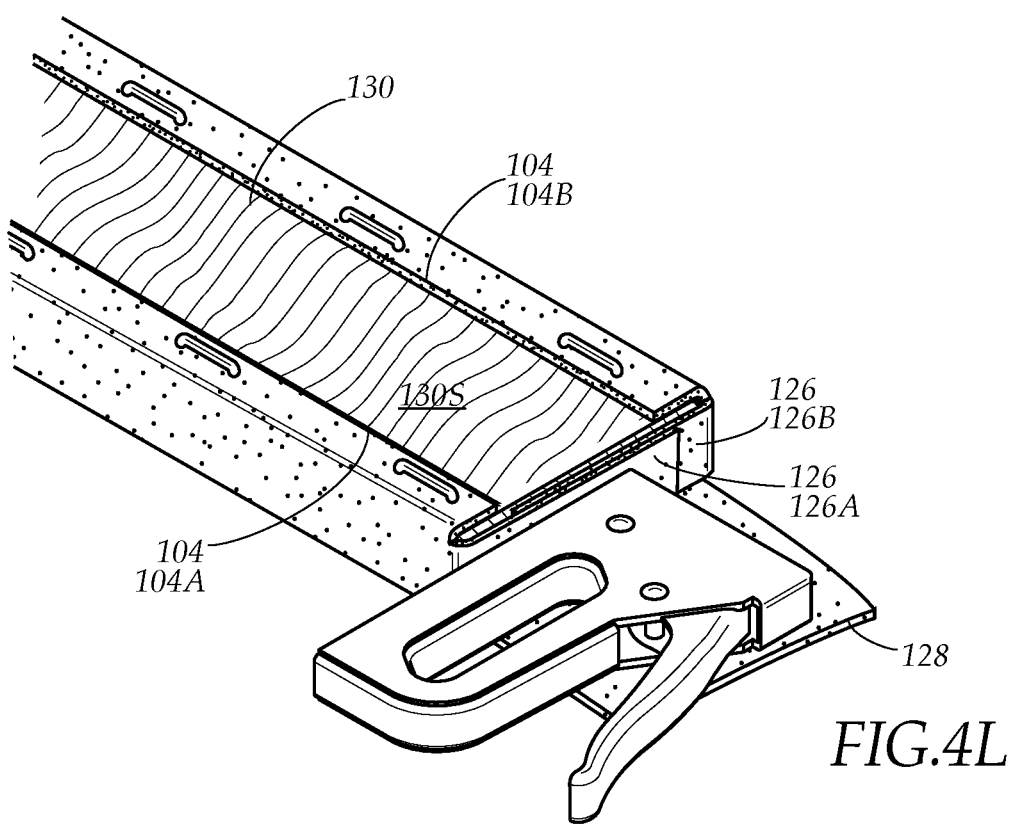
FIG. 4L is a perspective view of a trailer bunk board positioned over a resultant carpet workpiece formed using the trailer bunk board recarpeting template, illustrating a manner in which the flaps of the carpet workpiece are folded over the end of the bunk board prior to fastening according to one embodiment of the present disclosure.
Figure 4M:
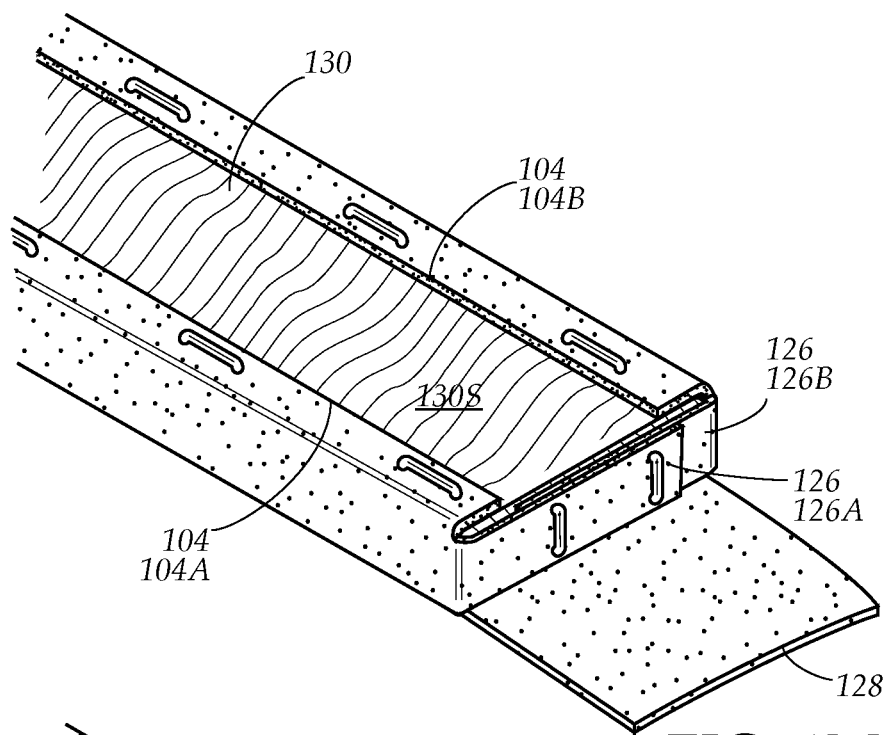
FIG. 4M is a perspective view of a trailer bunk board positioned over a resultant carpet workpiece formed using the trailer bunk board recarpeting template, illustrating the flaps of the carpet workpiece folded over and fastened to the end of the bunk board according to one embodiment of the present disclosure.
Figure 4N:
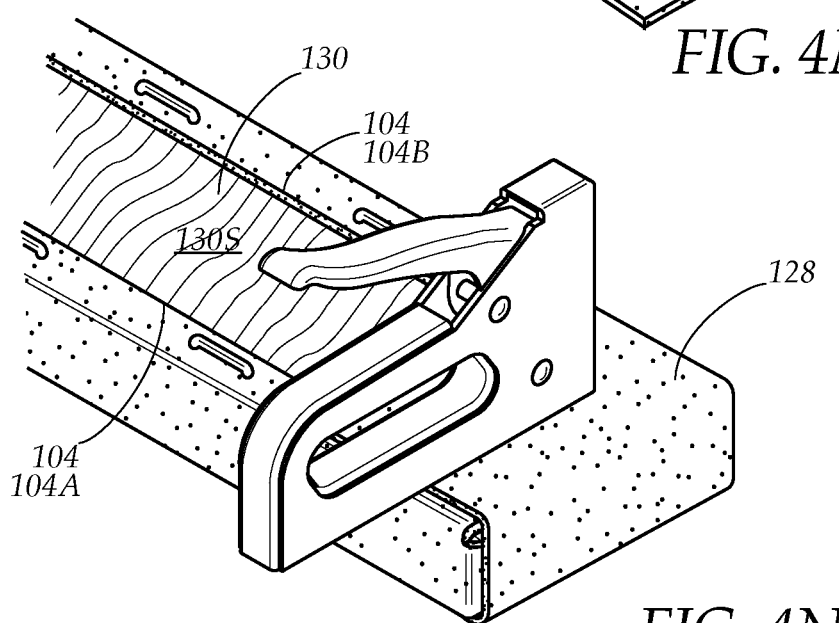
FIG. 4N is a perspective view of a trailer bunk board positioned over a resultant carpet workpiece formed using the trailer bunk board recarpeting template, illustrating a manner in which the tongue of the carpet workpiece is folded over the end of the bunk board to the bottom of the bunk board prior to fastening according to one embodiment of the present disclosure.
Figure 4O:
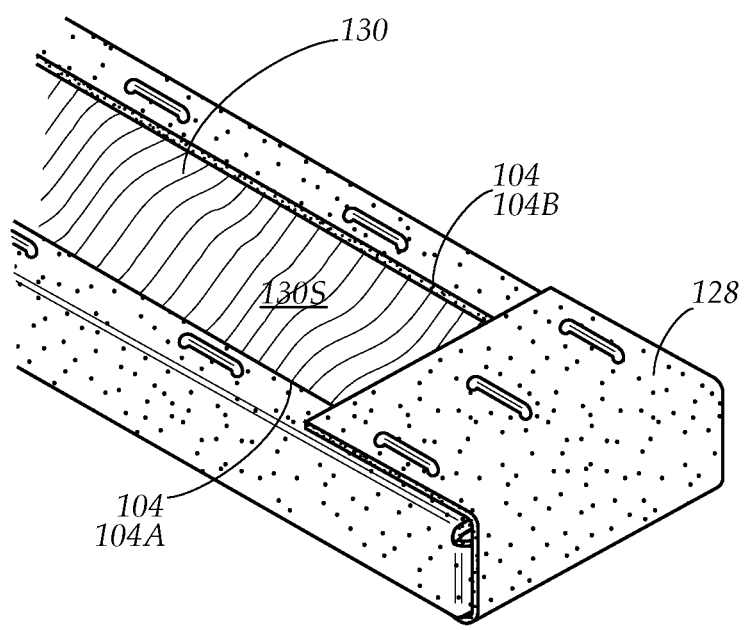
FIG. 4O is a perspective view of a trailer bunk board positioned over a resultant carpet workpiece formed using the trailer bunk board recarpeting template, illustrating the tongue of the carpet workpiece folded over the end of the bunk board and fastened to the bottom of the bunk board to form a recarpeted bunk board end according to one embodiment of the present disclosure.

Referring now to FIG. 4C and FIG. 4D, in some embodiments, the method includes marking the carpet 100 along the first longitudinal slit 46 and the first transverse slit 48 to form a first outer marking 112 on the carpet 100 underneath the first longitudinal slit 46 and the first transverse slit 48, marking the second longitudinal slit 78 and the second transverse slit 80 to form a second outer marking 114 on the carpet 100 underneath the second longitudinal slit 78 and the second transverse slit 80.

Referring now to FIG. 4E, FIG. 4F, FIG. 4G, and FIG. 4H, the resultant first and second outer markings 112, 114 will be L-shaped, defining excess areas 116, 118 circumscribed by the markings 112, 114, or disposed between each of the markings 112, 114 and the lateral edge 102 and longitudinal edge 104 of the carpet 100. Marking may be done using a writing utensil or other tool that is capable of marking or leaving a visible impression or stain on a carpet. Further, the marking may consist of drawing or forming a visible impression of a line with the writing utensil or tool.

Next, the method includes cutting along the first inner marking 106 in a direction substantially perpendicular to the lateral edge 102 of the carpet 100 to form a first substantially linear cut 120, cutting along the second inner marking 108 in a direction substantially perpendicular to the lateral edge 102 of the carpet 100 to form a second substantially linear cut 122, cutting away the excess area 116, or the area of the carpet 100 between the first outer marking 112, a first longitudinal edge 104A of the carpet 100, and the lateral edge 102 of the carpet 100, and cutting away the excess area 118 of the carpet 100, or the area between the second outer marking 114, a second longitudinal edge 104B of the carpet 100, and the lateral edge of the carpet 102 to form the resultant carpet workpiece 124. Cutting away the excess 116, 118 and cutting the first and second substantially linear cuts 120, 122, as described above, forms a pair of end flaps 126 and a tongue 128 in the resultant carpet workpiece 124.

Referring now to FIG. 4I, FIG. 4J, FIG. 4K, FIG. 4L, FIG. 4M, FIG. 4N, and FIG. 4O, in embodiments, to recarpet a boat trailer bunk board 130 using the resultant carpet workpiece 124, the trailer bunk board 130 is mounted onto the resultant carpet workpiece 124 such that an edge 132E of the end 132 of the bunk board 130 is aligned with the third inner marking 110. Next, the first longitudinal edge 104A is folded over a first side 134 of the bunk board 130 on to the top surface 130S of the bunk board 130 and fastened thereto and the second longitudinal edge 104B is folded over a second side 136 of the bunk board 130 onto the top surface 130S of the bunk board 130 and fastened thereto, or vice versa. Next, the first end flap 126A of the pair of the end flaps 126 is folded against the end 132 and fastened thereto and the second end flap 126B of the pair of end flaps 126 is folded against the end 132 and fastened thereto, or vice versa. Lastly, the tongue 128 is folded over the end 132 onto the top surface 130S and fastened thereto.

Figure 5:
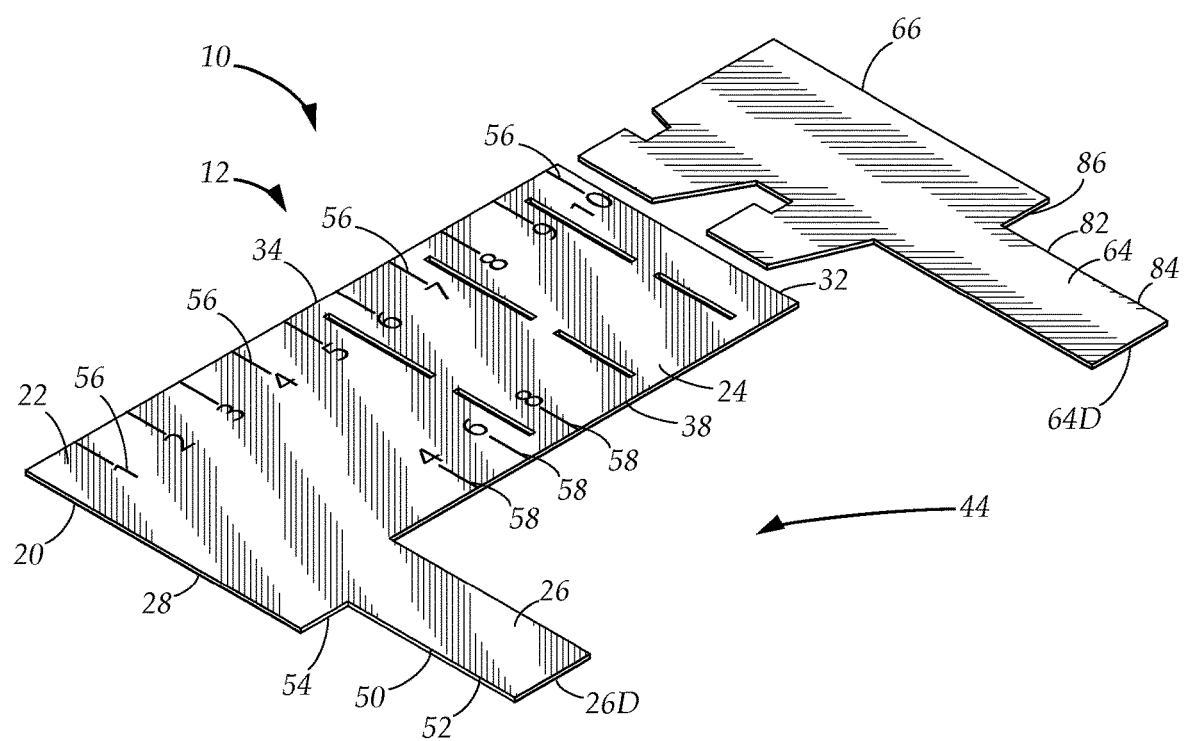
FIG. 5 is a perspective view of the trailer bunk board recarpeting template illustrating the first member and second member separated prior to engagement of the male member with the template-adjusting female slits and prior to positioning of the template over a carpet for marking according to another embodiment of the present disclosure.

Referring now to FIG. 5, in embodiments, the first leg 26 may comprise a first cut-out portion 50 recessed inwardly from the first outer edge 28 toward a center of the first leg 26. The first cut-out portion 50 extends to the distal end 26D of the first leg 26 forming a first longitudinal cut-out edge 52 linearly offset with respect to the first outer edge 28 and a first transverse cut-out edge 54 linearly offset with respect to the lower midsection edge 38. The second leg 64 may comprise a second cut-out portion 82 recessed inwardly from the second outer edge 66 toward a center of the second leg 64. The cut-out portion 82 extends to the distal end 64D of the second leg 64 forming a second longitudinal cut-out edge 84 linearly offset with respect to the second outer edge 66 and a second transverse cut-out edge 86 linearly offset with respect to the lower midsection edge 38.

In embodiments, the body 12 may further comprise a plurality of measurement markings 56 disposed on the first member 20 and extending along the upper edge 34, or a longitudinal edge, of the first member 20. The measurement markings 56 may extend from the first section 22 to the midsection 24 spanning the upper edge 34 to the outer midsection edge 32 and interspaced at common intervals for measuring. For example, the measurement markings 56 may be spaced in imperial or metric system units of measurements, such as inch increments or centimeter increments.

In embodiments, the body 12 may further comprise reference indicia 58 disposed along the lower midsection edge 38 and interspaced at common intervals. Each of the reference indicia 58 corresponding to a bunk board of a particular width and identifies the center of the width of the space 44 that corresponds to the center of the bunk board of the particular width. In this way, the center of the width of the space 44 identifies a reference point upon which to position the template 10, or space 44, such that the template 10 corresponds to the bunk board of the particular width and is positioned on the carpet to properly identify the areas to be cut to accommodate the bunk board of the particular width.

Figure 6A:
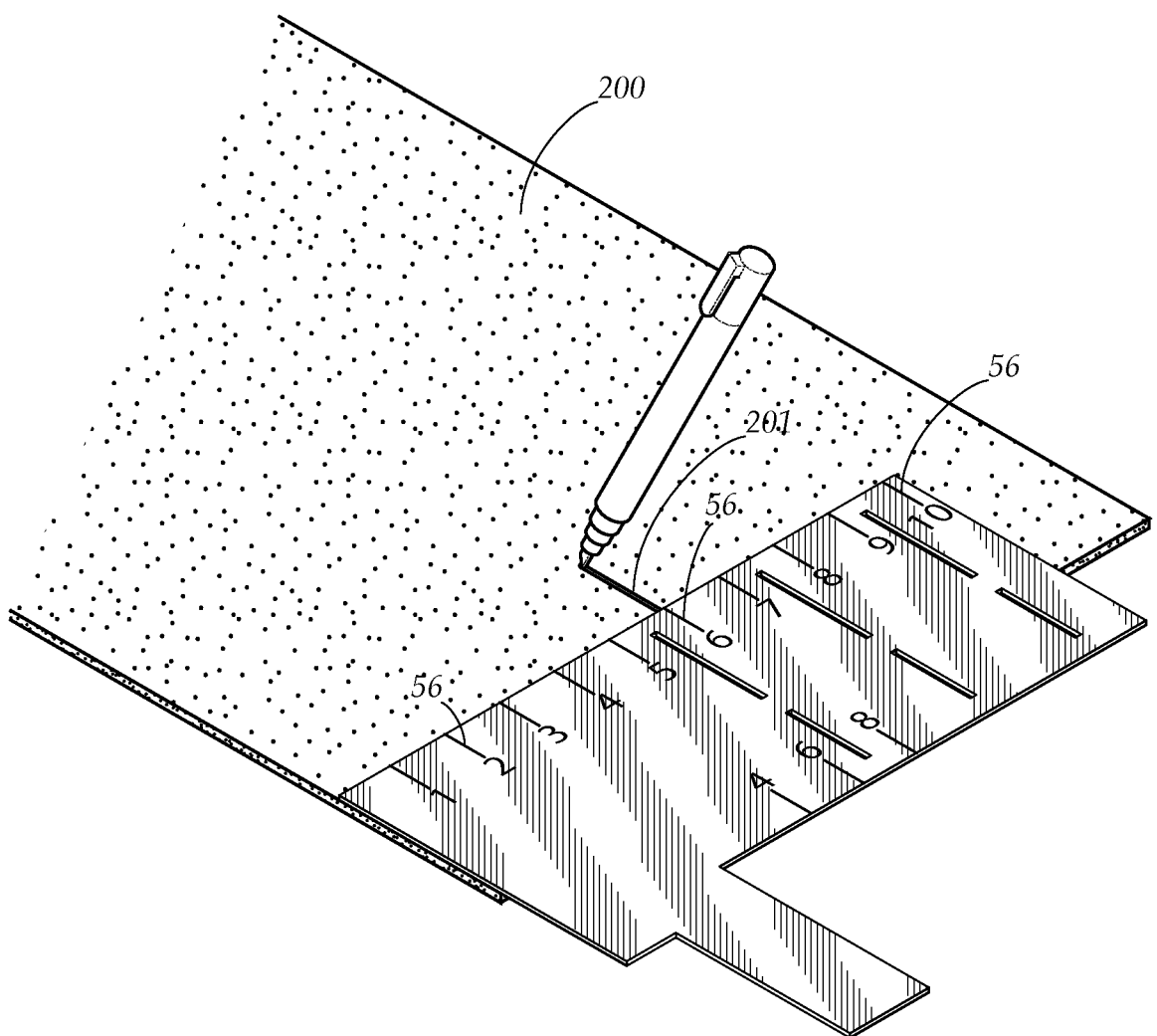
FIG. 6A is a perspective view of the trailer bunk board recarpeting template positioned over a larger uncut piece of carpet, illustrating a manner in which the center of the width of carpet is identified using the measurement markings of the template according to another embodiment of the present disclosure.

Referring now to FIG. 6A, the present disclosure provides a method of using the template of FIG. 5 to mark and cut a carpet for the purpose of recarpeting a trailer bunk board. In embodiments, the method includes identifying a center of a width of a carpet 200 by using the plurality of measurement markings 56. This may include first determining the width of the carpet 200 using the measurement markings 56 and then based on that width identifying half of the width using the measurement markings 56. Next, the method may include marking the center of the width of the carpet 200 to form a central reference point 201 on the carpet 200.

Figure 6B:
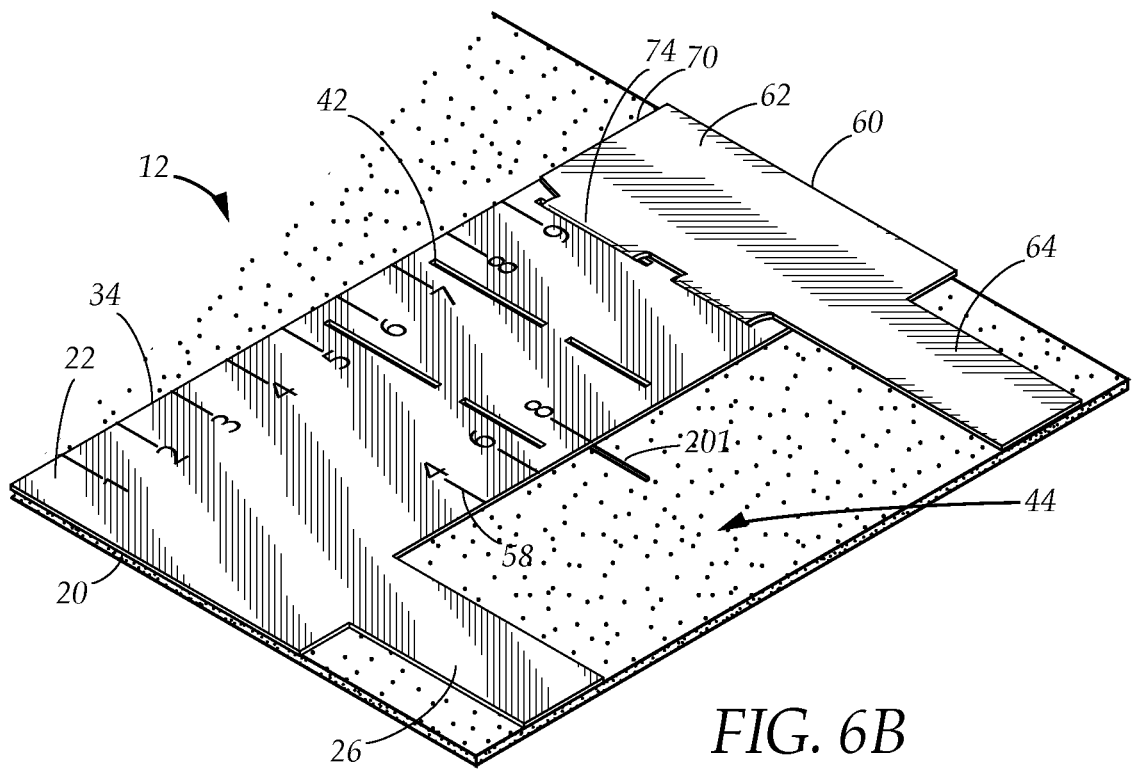
FIG. 6B is a perspective view of the trailer bunk board recarpeting template positioned over a larger uncut piece of carpet, illustrating a manner in which the reference indicia is used to identify a reference point upon which to center the template when marking the carpet such that the template corresponds to a trailer bunk board of a first size and the resultant marked and cut carpet workpiece corresponds to the trailer bunk board of the first size according to another embodiment of the present disclosure.
Figure 6C:
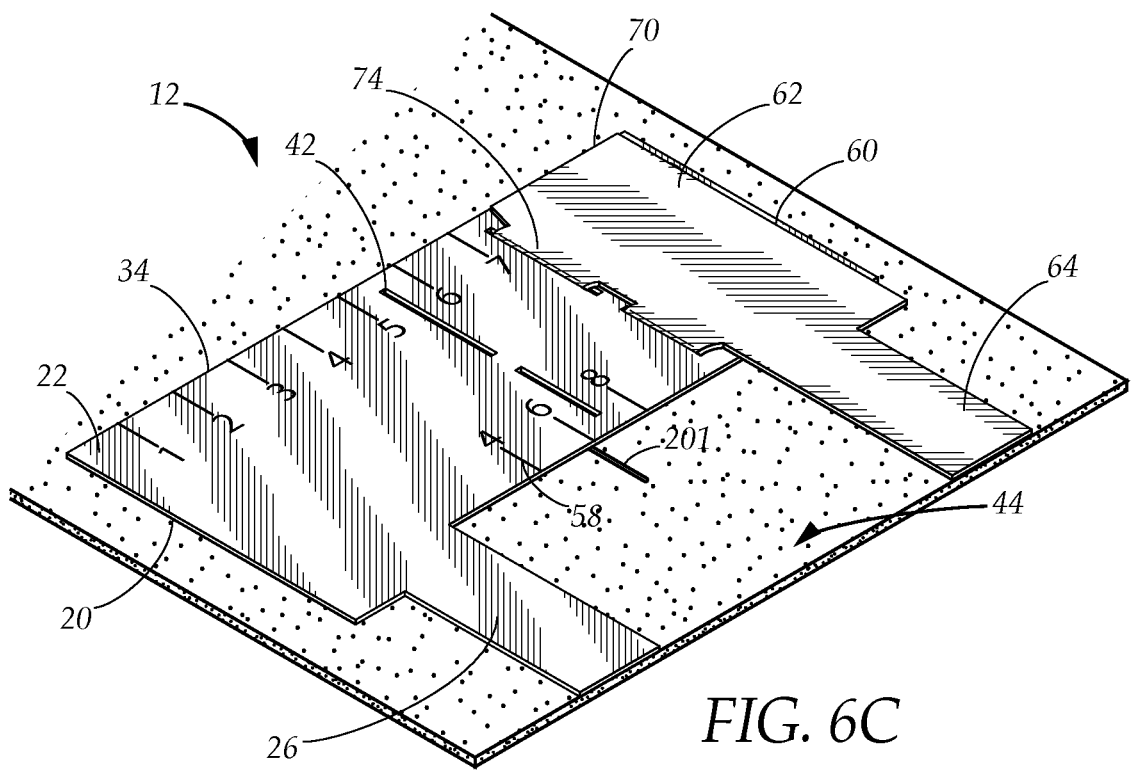
FIG. 6C is a perspective view of the trailer bunk board recarpeting template positioned over a larger uncut piece of carpet, illustrating a manner in which the reference indicia is used to identify a reference point upon which to center the template when marking the carpet such that the template corresponds to a trailer bunk board of a second size and the resultant marked and cut carpet workpiece corresponds to the trailer bunk board of the second size according to another embodiment of the present disclosure.
Figure 6D:
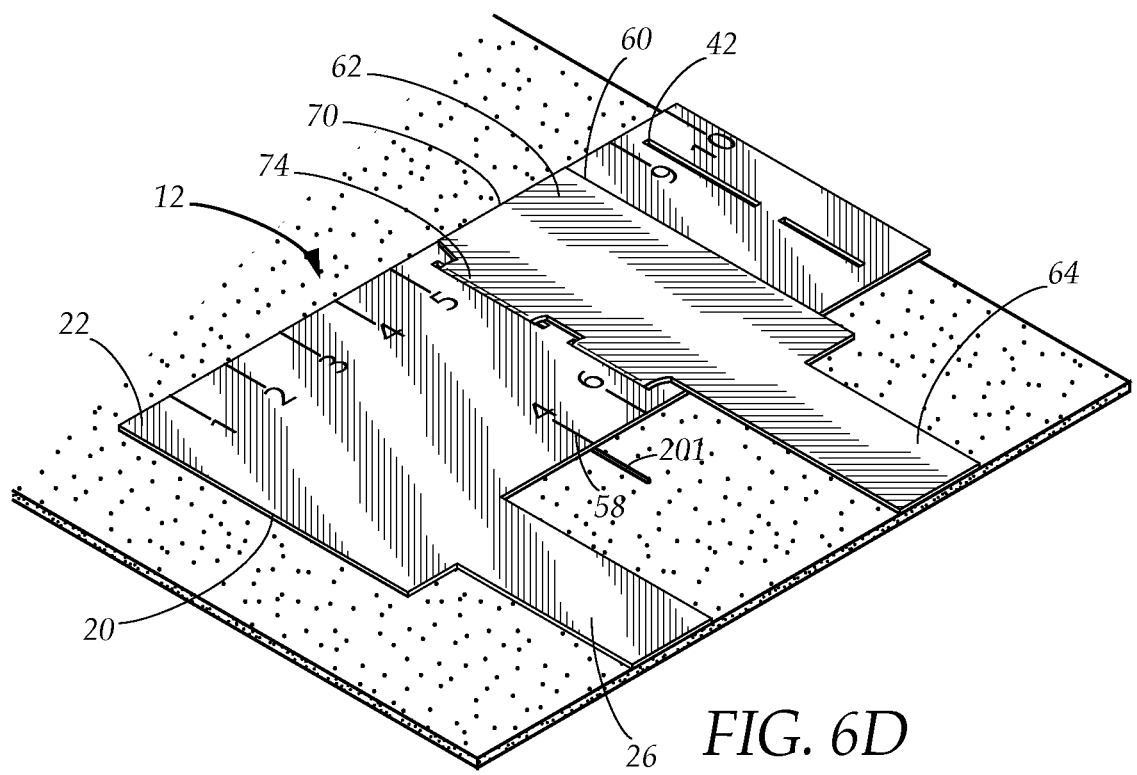
FIG. 6D is a perspective view of the trailer bunk board recarpeting template positioned over a larger uncut piece of carpet, illustrating a manner in which the reference indicia is used to identify a reference point upon which to center the template when marking the carpet such that the template corresponds to a trailer bunk board of a third size and the resultant marked and cut carpet workpiece corresponds to the trailer bunk board of the third size according to another embodiment of the present disclosure.

Referring now to FIG. 6B, FIG. 6C, and FIG. 6D, the method further includes adjusting the first section 22 of the body 12 with respect to the second section 62 of the body 12 to make the space 44 between the first leg 26 and the second leg 64 have a width that is substantially equal in size to the width of a trailer bunk board to be recarpeted. The first section 22 may be adjusted with respect to the second section 62, for example, by selectively engaging either the at least two template-adjusting female slits 42 with the male member 74. In some embodiments, to adjust the template, the method further incudes aligning the upper edge 34 of the first member 20 with the upper edge 70 of the second member 60. Next, the method includes aligning the reference indicia 58 corresponding to the particular width of the bunk board to be recarpeted with the central reference point 201 to identify the center of the trailer bunk board to be recarpeted.

Figure 6E:
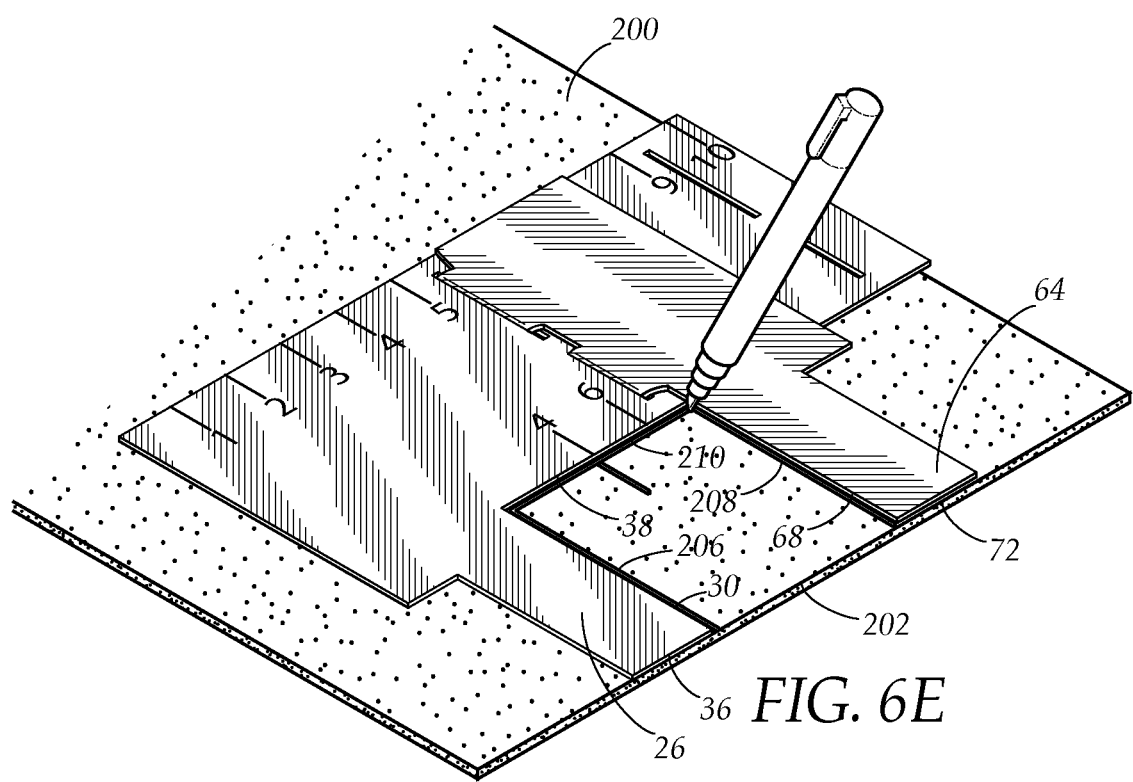
FIG. 6E is a perspective view of the trailer bunk board recarpeting template positioned over a larger uncut piece of carpet, illustrating the template centered with respect to the longitudinal edges of the carpet and further illustrating a manner in which the template is marked along its inner edges to establish inner markings on the carpet for cutting according to another embodiment of the present disclosure.

Referring now to FIG. 6E, the method further includes aligning the lower first leg edge 36 and the lower edge 72 of the second leg 64 with a lateral edge 202 of a carpet 200. Next, the method includes marking the carpet 200 along the inner first leg edge 30 to form a first inner marking 206 on the carpet 200, along the inner edge 68 of the second leg 64 to form a second inner marking 208 on the carpet 200, and along the lower midsection edge 38 to form a third inner marking 210 on the carpet 200.

Figure 6F:
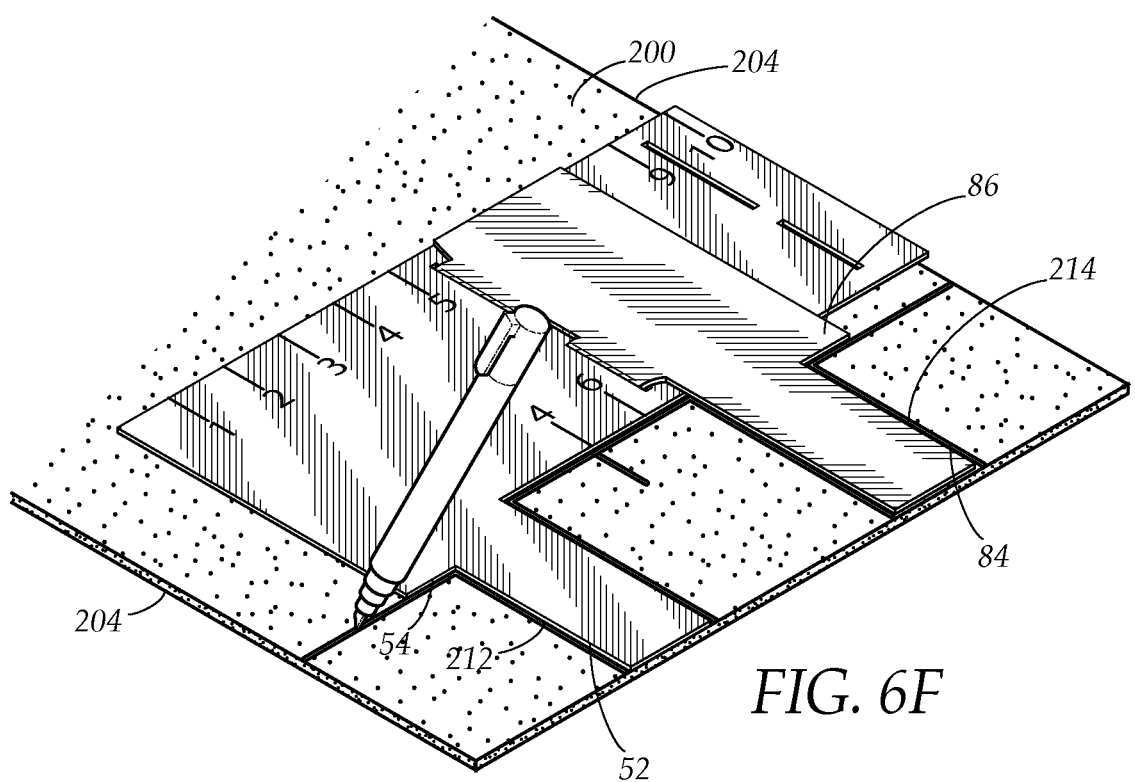
FIG. 6F is a perspective view of the trailer bunk board recarpeting template positioned over a larger uncut piece of carpet, illustrating the template centered with respect to the longitudinal edges of the carpet and further illustrating a manner in which the template is marked along its outer edges to establish outer markings on the carpet for cutting according to another embodiment of the present disclosure.

Referring now to FIG. 6F the method may include marking the carpet 200 along the first longitudinal cut-out edge 52 and the first transverse cut-out edge 54 to form a first outer marking 212 on the carpet 200, marking the carpet 200 along the second longitudinal cut-out edge 84 and the second transverse cut-out edge 86 to form a second outer marking 214 on the carpet 200. The method may include extending the mark along the first transverse cut-out edge 54 and the second longitudinal cut-out edge 84 to the longitudinal edges 204 of the carpet 200.

Figure 6G:
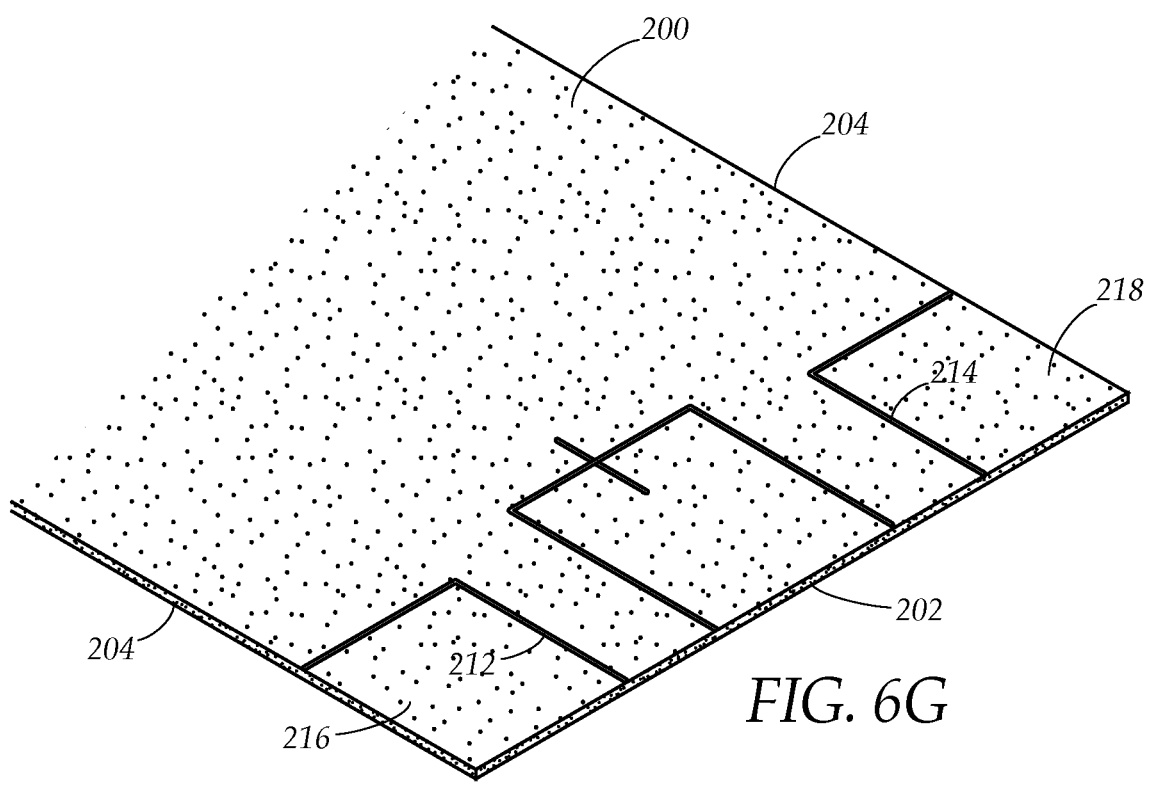
FIG. 6G is a perspective view of the trailer bunk board recarpeting template removed from the carpet after marking, illustrating the inner and outer markings on the carpet according to another embodiment of the present disclosure.
Figure 6H:
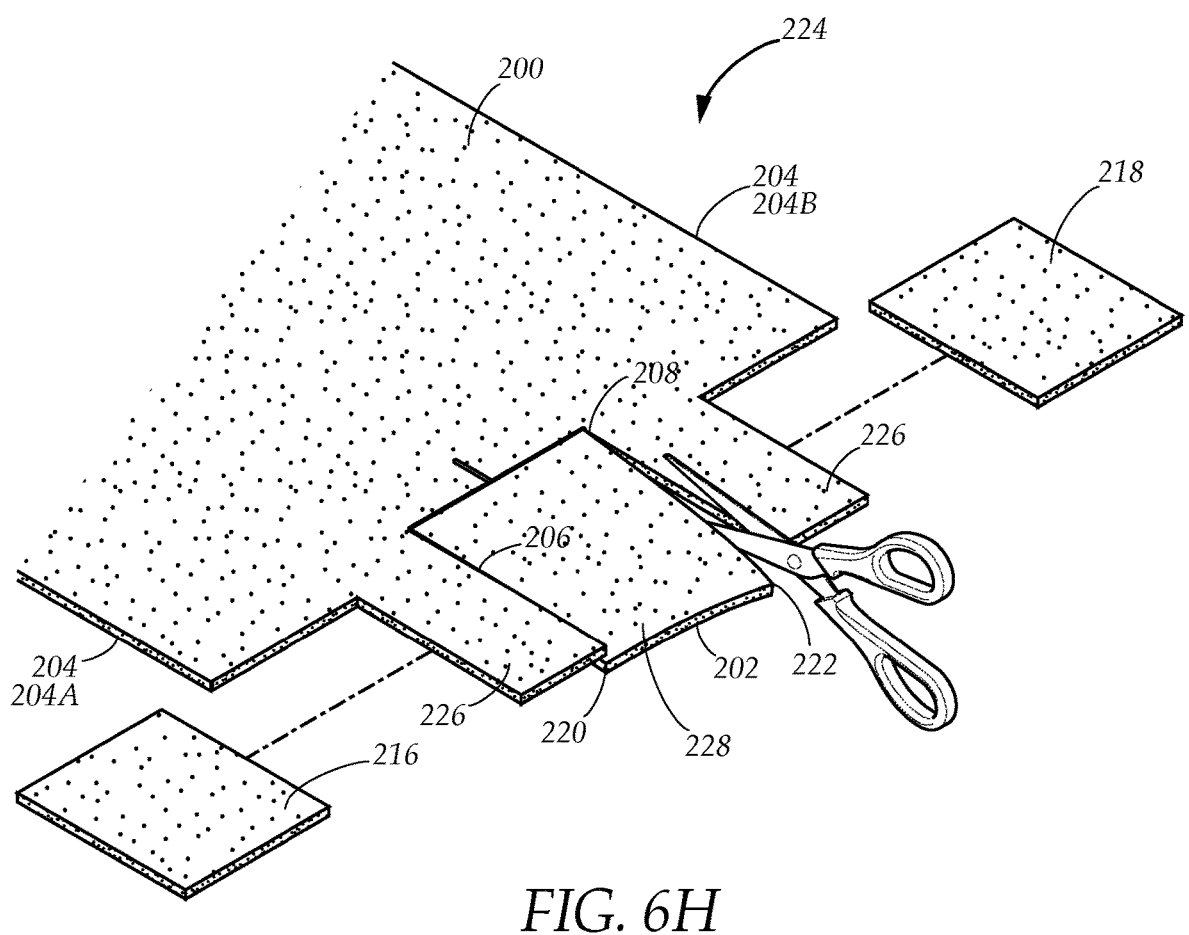
FIG. 6H is a perspective view of the trailer bunk board recarpeting template removed from the carpet after marking, illustrating a manner in which the carpet is cut along the inner and outer markings to form the resultant carpet workpiece which accommodates a trailer bunk board according to another embodiment of the present disclosure.
Figure 6I:
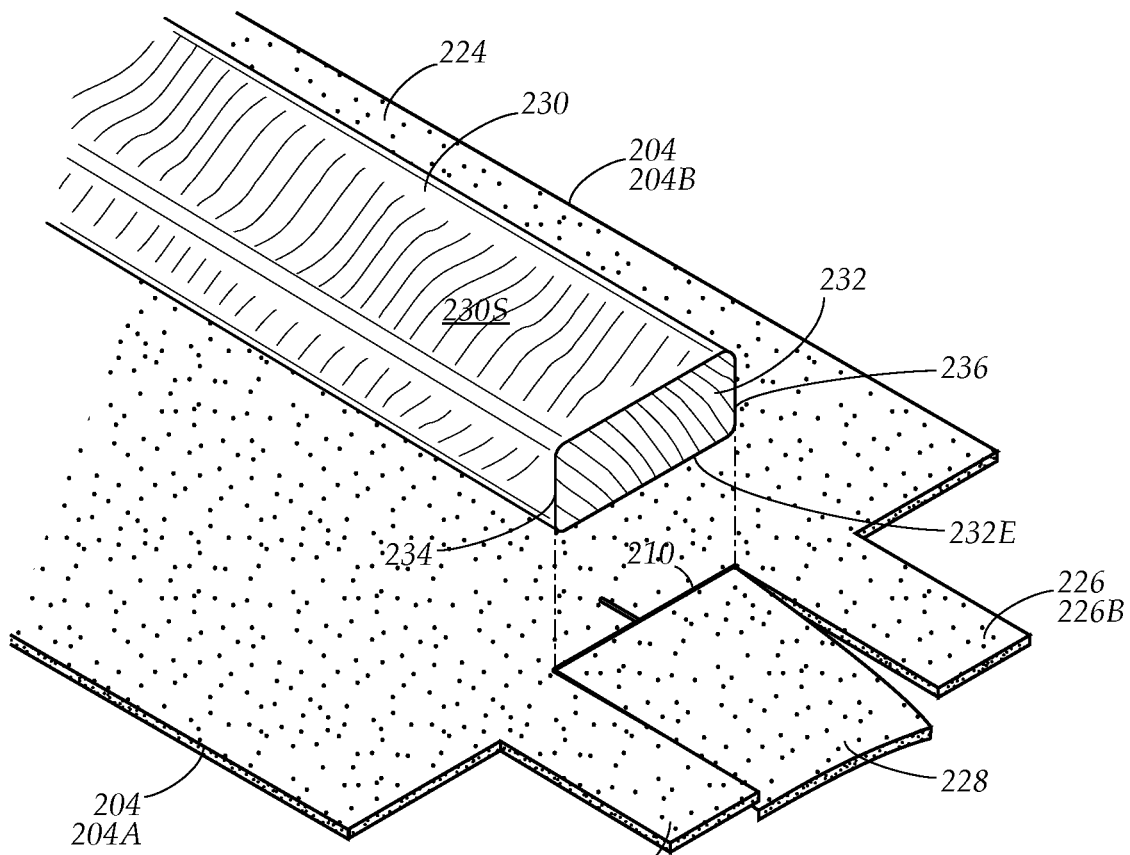
FIG. 6I is a perspective view of a trailer bunk board superimposed over a resultant carpet workpiece formed using the trailer bunk board recarpeting template, illustrating a manner in which the trailer bunk board aligns with the inner markings on the carpet in order to position the trailer bunk board and wrap the resultant carpet workpiece over the trailer bunk board according to one embodiment of the present disclosure.
Figure 6J:
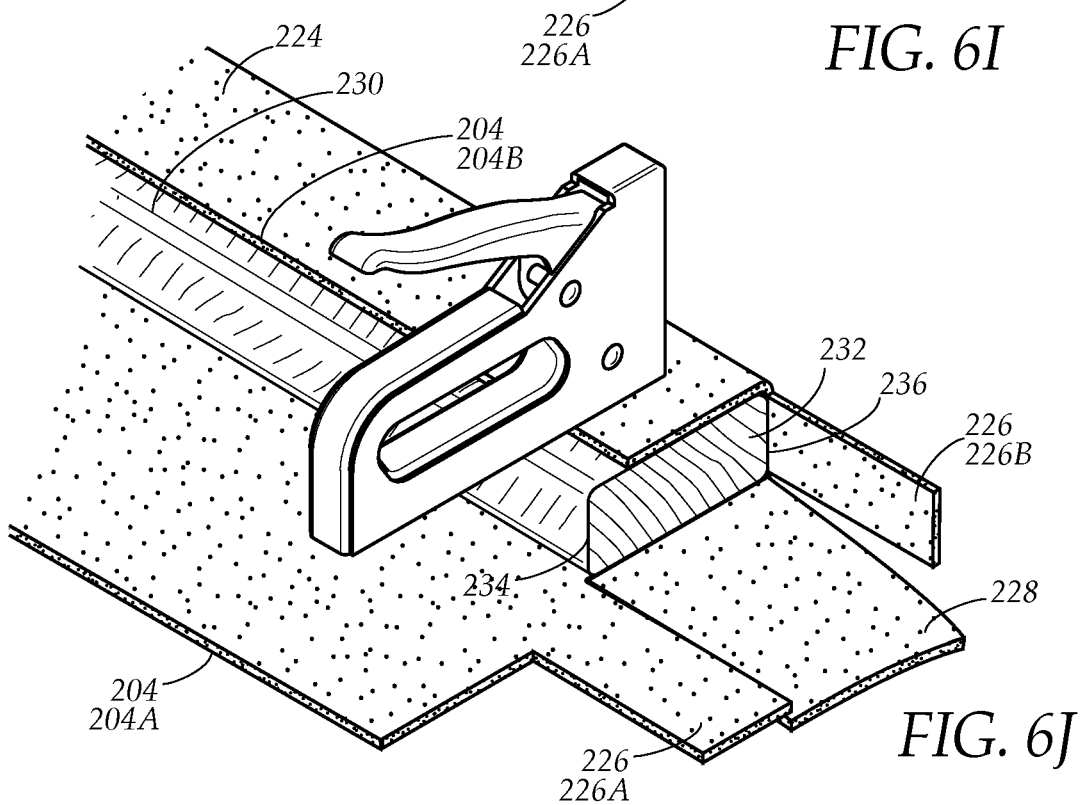
FIG. 6J is a perspective view of a trailer bunk board positioned over a resultant carpet workpiece formed using the trailer bunk board recarpeting template, illustrating a manner in which a side of the carpet workpiece is folded over the bunk board and fastened thereto according to one embodiment of the present disclosure.
Figure 6K:
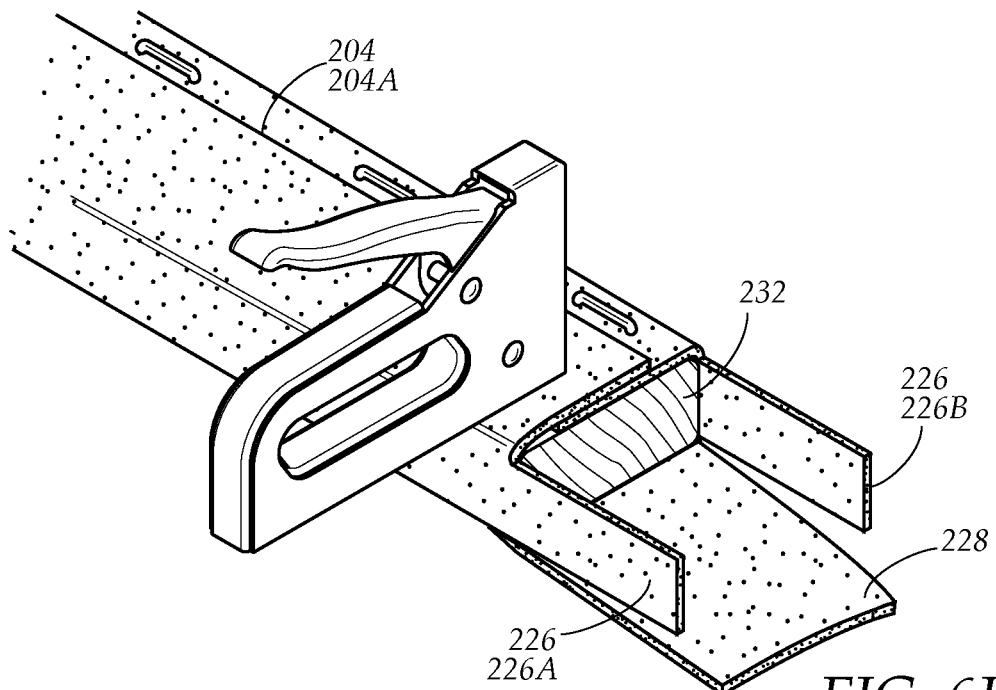
FIG. 6K is a perspective view of a trailer bunk board positioned over a resultant carpet workpiece formed using the trailer bunk board recarpeting template, illustrating a manner in which another side of the carpet workpiece is folded over the bottom of the bunk board and fastened thereto according to one embodiment of the present disclosure.
Figure 6L:
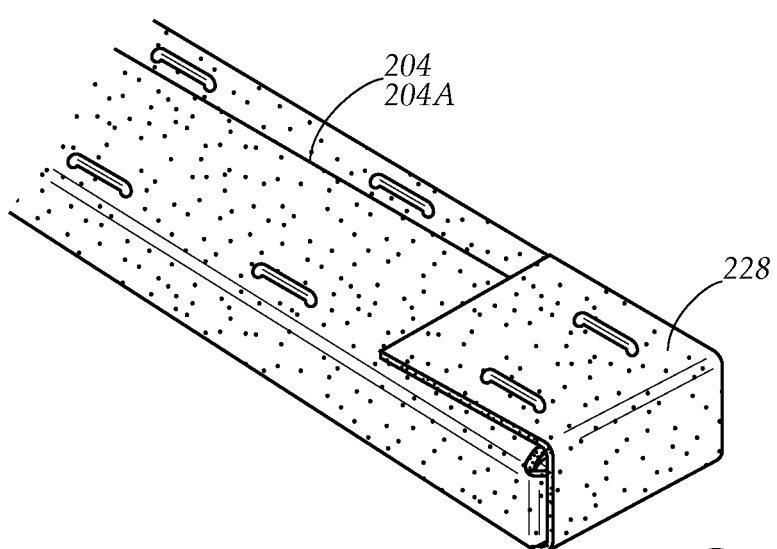
FIG. 6L is a perspective view of a trailer bunk board positioned over a resultant carpet workpiece formed using the trailer bunk board recarpeting template, illustrating the tongue of the carpet workpiece folded over the end of the bunk board and fastened to the bottom of the bunk board to form a recarpeted bunk board end according to one embodiment of the present disclosure.

Referring now to FIGS. 6G and 6H, the resultant first and second outer markings 212, 214 will be L-shaped, defining excess areas 216, 218 circumscribed by the markings 212, 214, or disposed between each of the markings 212, 214 and the lateral edge 202 and longitudinal edge 204 of the carpet 200. Marking may be done using a writing utensil or other tool that is capable of marking or leaving a visible impression or stain on a carpet. Further, the marking may consist of drawing or forming a visible impression of a line with the writing utensil or tool.

The method further includes cutting along the first inner marking 206 in a direction substantially perpendicular to the lateral edge 202 of the carpet 200 to form a first substantially linear cut 220, cutting along the second inner marking 208 in a direction substantially perpendicular to the lateral edge 202 of the carpet 200 to form a second substantially linear cut 222, cutting away the excess area 216 of the carpet 200, or the area of the carpet 200 between the first outer marking 212, the lateral edge 202 of the carpet 200, and a first longitudinal edge 204A of the carpet 200, and cutting away the excess area 218 of the carpet 200, or the area of the carpet 200 between the second outer marking 214, the lateral edge 202 of the carpet 200, and a second longitudinal edge 204B of the carpet 200 to form the resultant carpet workpiece 224. Cutting away the excess 216, 218 and cutting the first and second substantially linear cuts 220, 222, as described above, forms a pair of end flaps 226 and a tongue 228 in the resultant carpet workpiece 224.

Referring now to FIG. 6I, FIG. 6J, FIG. 6K, and FIG. 6L, to recarpet a boat trailer bunk board 230 using the resultant carpet workpiece 224 the trailer bunk board 230 is mounted onto the resultant carpet workpiece 224 such that an edge 232E of the end 232 of the bunk board 230 is aligned with the third inner marking 210. Next, the first longitudinal edge 204A is folded over a first side 234 of the bunk board 230 on to the top surface 230S of the bunk board 230 and fastened thereto and the second longitudinal edge 204B is folded over a second side 236 of the bunk board 230 onto the top surface 230S of the bunk board 230 and fastened thereto, or vice versa. Next, the first end flap 226A of the pair of the end flaps 226 is folded against the end 232 and fastened thereto and the second end flap 226B of the pair of end flaps 226 is folded against the end 232 and fastened thereto, or vice versa. Lastly, the tongue 228 is folded over the end 232 onto the top surface 230S and fastened thereto.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly. The term "substantially" is defined as at least 95% of the term being described and/or within a tolerance level known in the art and/or within 5% thereof.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a trailer bunk board recarpeting template and method of using the same. The disclosure is illustrated by example in the drawing figures, and throughout the written description. It should be understood that numerous variations are possible, while adhering to the inventive concept. Such variations are contemplated as being a part of the present disclosure.

What is claimed is:

1. A trailer bunk board recarpeting template for identifying the areas of a carpet to be cut to recarpet trailer bunk boards of various sizes, comprising:
a body including a first section having a first outer edge, a second section having a second outer edge, the first section opposite the second section, the first outer edge opposite the second outer edge, a midsection disposed between the first section and the second section, a first surface, and a second surface, the first surface opposite the second surface, the first section including a first leg extending orthogonally outwardly relative to the body, the second section including a second leg extending orthogonally outwardly relative to the body, the first leg and the second leg coplanar with the body and symmetrical with respect to each other about a center of the body, the first leg and second leg forming a space therebetween that is disposed underneath the midsection, the first leg including a proximal end and a distal end, the proximal end opposite the distal end, a length, and a width, the second leg including a proximal end and a distal end, the proximal end opposite the distal end, a length, and a width, the midsection including a width, a length, a lower midsection edge spanning the midsection between the first leg and the second leg, and at least two template-adjusting female slits extending across the width of the midsection and extending entirely through the body from the first surface to the second surface, the template-adjusting female slits spaced apart from each other at a distance along the length of the midsection, the first section adjustable with respect to the second section along the template-adjusting female slits, wherein:
the space includes a width defined by the distance between the first leg and the second leg,
the width of the space is adjustable by positioning the first section on any one of the template-adjusting female slits,
the width of the space is adjustable to a size that corresponds to the width of a bunk board to be recarpeted, and the space identifies areas to be cut on a carpet to fit the bunk board to be recarpeted.

2. The trailer bunk board recarpeting template of claim 1, wherein:
the first leg further comprises a first cut-out portion recessed inwardly from the first outer edge toward a center of the first leg, the first cut-out portion extending to the distal end of the first leg, the first cut-out portion forming a first longitudinal cut-out edge linearly offset with respect to the first outer edge and a first transverse cut-out edge linearly offset with respect to the lower midsection edge, and
the second leg further comprises a second cut-out portion recessed inwardly from the second outer edge toward a center of the second leg, the cut-out portion extending to the distal end of the second leg, the second cut-out portion forming a second longitudinal cut-out edge linearly offset with respect to the second outer edge and a second transverse cut-out edge linearly offset with respect to the lower midsection edge.

3. The trailer bunk board recarpeting template of claim 2, wherein the body further comprises a plurality of measurement markings extending along a longitudinal edge of the body from the first section to the midsection, the plurality of measurement markings interspaced at common intervals for measuring.

4. The trailer bunk board recarpeting template of claim 3, wherein the body further comprises reference indicia disposed along the lower midsection edge and interspaced at common intervals, each reference indicia corresponding to a bunk board of a particular width and identifying the center of the width of the space that corresponds to the center of the bunk board of the particular width, the center of the width of the space identifying a reference point upon which to position the template on a carpet such that the template corresponds to the bunk board of the particular width and is positioned on the carpet to properly identify the areas to be marked and cut to accommodate the bunk board of the particular width.

5. The trailer bunk board recarpeting template of claim 1, wherein:
the first leg further comprises a first longitudinal slit extending longitudinally along the length of the first leg and extending entirely through the body from the first surface to the second surface, and
the second leg further comprises a second longitudinal slit extending longitudinally along the length of the second leg and extending entirely through the body from the first surface to the second surface.

6. The trailer bunk board recarpeting template of claim 2, wherein the body comprises a first member and a separate and distinct second member, the first member including the first section, the midsection, the first leg, the first outer edge, an inner first leg edge, an outer midsection edge, the inner first leg edge and the outer midsection edge parallel and linearly offset, the first outer edge opposite the inner first leg edge and the outer midsection edge, an upper edge, a lower first leg edge, and the lower midsection edge, the lower first leg edge and the lower midsection edge parallel and linearly offset, the upper edge opposite the lower first leg edge and the lower midsection edge, the second member including the second section, the second leg, the second outer edge, an inner edge, the second outer edge opposite the inner edge, an upper edge, a lower edge, the upper edge opposite the lower edge, and a male member protruding outwardly from the inner edge, the male member coplanar with the second member, the male member configured to removably engage the at least two template-adjusting female slits of the midsection.

7. The trailer bunk board recarpeting template of claim 6, wherein:
the first leg further comprises a first transverse slit extending orthogonally outwardly from an upper end of the first longitudinal slit toward the outer edge of the first section, the first transverse slit extending entirely though the first member from the first surface to the second surface; and
the second leg further comprises a second transverse slit extending orthogonally outwardly from an upper end of the second longitudinal slit toward the outer edge of the second section, the second transverse slit extending entirely though the second member from the first surface to the second surface.

8. The trailer bunk board recarpeting template of claim 7, wherein:
the first longitudinal slit comprises a pair of collinear slits spaced apart from each other; and
the second longitudinal slit comprises a pair of collinear slits spaced apart from each other.

9. The trailer bunk board recarpeting template of claim 8, wherein each of the at least two template-adjusting female slits comprises a pair of collinear slits spaced apart from each other and configured to receive the male member.

10. The trailer bunk board recarpeting template of claim 9, wherein the male member comprises a pair of planar hooks that correspond to the pair of collinear slits, the pair of hooks coplanar with respect to each other and configured to removably engage the pair of collinear slits.

11. The trailer bunk board recarpeting template of claim 10, wherein:
the at least two template-adjusting female slits comprises three pairs of collinear slits including a first pair of collinear slits, a second pair of collinear slits, and a third pair of collinear slits;
the first pair of collinear slits disposed adjacent the outer midsection edge;
the second pair of collinear slits disposed interiorly with respect to the first pair of collinear slits; and
the third pair of collinear slits disposed interiorly with respect to the second pair of collinear slits.

12. The trailer bunk board recarpeting template of claim 11, wherein:
when the pair of planar hooks are engaged with the first pair of collinear slits, the width of the space is at its maximum width;
when the pair of planar hooks are engaged with the third pair of collinear slits, the width of the space is at its minimum width; and
when the pair of planar hooks are engaged with the second pair of collinear slits, the width of the space is at its median width.

13. The trailer bunk board recarpeting template of claim 12, wherein the length of the first leg and the second leg is substantially 3 and 3/16 inches.

14. The trailer bunk board recarpeting template of claim 13, wherein:
the width of the space at its maximum width is substantially 8 inches;
the width of the space at its minimum width is substantially 4 inches; and
the width of the space at its median width is substantially 6 inches.

15. The trailer bunk board recarpeting template of claim 14, wherein:
the distance between the first pair of collinear slits and the second pair of collinear slits is substantially 2 inches; and
the distance between the second pair of collinear slits and the third pair of collinear slits is substantially 2 inches.

16. The trailer bunk board recarpeting template of claim 15, wherein:
the distance between the inner first leg edge and the first longitudinal slit is substantially 1 and 5/8 inches; and
the distance between the inner edge if the second leg and the second longitudinal slit is substantially 1 and 5/8 inches.

17. The trailer bunk board recarpeting template of claim 16, wherein:
the distance between the inner first leg edge and the first cut-out portion is substantially 1 and 5/8 inches; and
the distance between the inner edge of the second leg and the second cut-out portion is substantially 1 and 5/8 inches.

18. A method of cutting a carpet to recarpet a trailer bunk board using the trailer bunk board recarpeting template of claim 1, comprising:
adjusting the first section of the body with respect to the second section of the body to make the space between the first leg and the second leg have a width that is substantially equal in size to the width of a trailer bunk board to be recarpeted;
aligning a lower edge of the first leg and a lower edge of the second leg with a lateral edge of a carpet;
marking the carpet along an inner edge of the first leg to form a first inner marking on the carpet;
marking the carpet along an inner edge of the second leg to form a second inner marking on the carpet;
marking the carpet along the first outer edge to form a first outer marking on the carpet,
marking the carpet along the second outer edge to form a second outer marking on the carpet;
cutting along the first inner marking in a direction substantially perpendicular to the lateral edge of the carpet to form a first substantially linear cut;
cutting along the second inner marking in a direction substantially perpendicular to the lateral edge of the carpet to form a second substantially linear cut;
cutting away an area of the carpet between the first outer marking and a first longitudinal edge of the carpet; and
cutting away an area of the carpet between the second outer marking and a second longitudinal edge of the carpet.

19. A method of cutting a carpet to recarpet a trailer bunk board using the trailer bunk board recarpeting template of claim 2, comprising:
adjusting the first section of the body with respect to the second section of the body to make the space between the first leg and the second leg have a width that is substantially equal in size to the width of a trailer bunk board to be recarpeted;
aligning a lower edge of the first leg and a lower edge of the second leg with a lateral edge of a carpet;
marking the carpet along an inner edge of the first leg to form a first inner marking on the carpet;
marking the carpet along an inner edge of the second leg to form a second inner marking on the carpet;
marking the carpet along the first longitudinal cut-out edge and the first transverse cut-out edge to form a first outer marking on the carpet,
marking the carpet along the second longitudinal cut-out edge and the second transverse cut-out edge to form a second outer marking on the carpet;
cutting along the first inner marking in a direction substantially perpendicular to the lateral edge of the carpet to form a first substantially linear cut;
cutting along the second inner marking in a direction substantially perpendicular to the lateral edge of the carpet to form a second substantially linear cut;
cutting away an area of the carpet between the first outer marking and a first longitudinal edge of the carpet; and
cutting away an area of the carpet between the second outer marking and a second longitudinal edge of the carpet.

20. The method of claim 19, further comprising:
aligning the first outer edge with the first longitudinal edge of the carpet; and
aligning the second outer edge with the first longitudinal edge of the carpet.

21. The method of claim 20, further comprising marking the lower midsection edge to form a third inner marking, the first inner marking and the second inner marking substantially parallel to each other, the third inner marking perpendicular to the first inner marking and the second inner marking.

22. A method of cutting a carpet to recarpet a trailer bunk board using the trailer bunk board recarpeting template of claim 4, comprising:
identifying a center of a width of a carpet by using the plurality of measurement markings;
marking the center of the width of the carpet to form a central reference point on the carpet;
adjusting the first section of the body with respect to the second section of the body to make the space between the first leg and the second leg have a width that is substantially equal in size to the width of a trailer bunk board to be recarpeted;
aligning the reference indicia corresponding to the particular width of the bunk board to be recarpeted with the central reference point to identify the center of the trailer bunk board to be recarpeted;
aligning a lower edge of the first leg and a lower edge of the second leg with a lateral edge of a carpet;
marking the carpet along an inner edge of the first leg to form a first inner marking on the carpet;
marking the carpet along an inner edge of the second leg to form a second inner marking on the carpet;
marking the carpet along the first longitudinal cut-out edge and the first transverse cut-out edge to form a first outer marking on the carpet,
marking the carpet along the second longitudinal cut-out edge and the second transverse cut-out edge to form a second outer marking on the carpet;
cutting along the first inner marking in a direction substantially perpendicular to the lateral edge of the carpet to form a first substantially linear cut;
cutting along the second inner marking in a direction substantially perpendicular to the lateral edge of the carpet to form a second substantially linear cut;
cutting away an area of the carpet between the first outer marking and a first longitudinal edge of the carpet; and
cutting away an area of the carpet between the second outer marking and a second longitudinal edge of the carpet.

23. The method of claim 22, further comprising marking the lower midsection edge to form a third inner marking, the first inner marking and the second inner marking substantially parallel to each other, the third inner marking perpendicular to the first inner marking and the second inner marking.

24. A method of cutting a carpet to recarpet a trailer bunk board using the trailer bunk board recarpeting template of claim 5, comprising:
- adjusting the first section of the body with respect to the second section of the body to make the space between the first leg and the second leg have a width that is substantially equal in size to the width of a trailer bunk board to be recarpeted;
- aligning a lower edge of the first leg and a lower edge of the second leg with a lateral edge of a carpet;
- marking the carpet along an inner edge of the first leg to form a first inner marking on the carpet;
- marking the carpet and along an inner edge of the second leg to form a second inner marking on the carpet;
- marking the first longitudinal slit to form a first outer marking on the carpet underneath the first longitudinal slit,
- marking the second longitudinal slit to form a second outer marking on the carpet underneath the second longitudinal slit;
- cutting along the first inner marking in a direction substantially perpendicular to the lateral edge of the carpet to form a first substantially linear cut;
- cutting along the second inner marking in a direction substantially perpendicular to the lateral edge of the carpet to form a second substantially linear cut;
- cutting away the area of the carpet between the first outer marking and a first longitudinal edge of the carpet; and
- cutting away the area of the carpet between the second outer marking and a second longitudinal edge of the carpet.

25. The method of claim 24, further comprising marking the lower midsection edge to form a third inner marking, the first inner marking and the second inner marking substantially parallel to each other, the third inner marking perpendicular to the first inner marking and the second inner marking.

26. A method of cutting a carpet to recarpet a trailer bunk board using the trailer bunk board recarpeting template of claim 6, comprising:
- adjusting the first member with respect to the second member to make the space between the first leg and the second leg have a width that is substantially equal in size to the width of a trailer bunk board to be recarpeted by inserting the male member into the at least two template-adjusting female slits;
- aligning the upper edge of the first member with the upper edge of the second member;
- aligning the lower first leg edge and the lower second leg edge with a lateral edge of a carpet;
- marking the carpet along the inner first leg edge to form a first inner marking on the carpet;
- marking the carpet along the inner edge of the second leg to form a second inner marking on the carpet;
- marking the carpet along the first outer edge to form a first outer marking on the carpet,
- marking the carpet along the second outer edge to form a second outer marking on the carpet;
- cutting along the first inner marking in a direction substantially perpendicular to the lateral edge of the carpet to form a first substantially linear cut;
- cutting along the second inner marking in a direction substantially perpendicular to the lateral edge of the carpet to form a second substantially linear cut;
- cutting away an area of the carpet between the first outer marking and a first longitudinal edge of the carpet; and
- cutting away an area of the carpet between the second outer marking and a second longitudinal edge of the carpet.

\* \* \* \* \*